(12) United States Patent
Maehara et al.

(10) Patent No.: US 7,187,506 B2
(45) Date of Patent: Mar. 6, 2007

(54) ACTUATOR DEVICE, OPTICAL DISK DEVICE, AND INFORMATION PLAYBACK DEVICE

(75) Inventors: Youichi Maehara, Kasuga (JP); Kazuhisa Ide, Ogori (JP); Nobuo Jikuya, Chikushino (JP); Tsuyoshi Kakuta, Kurume (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/170,609

(22) Filed: Jun. 30, 2005

(65) Prior Publication Data

US 2006/0001987 A1 Jan. 5, 2006

(30) Foreign Application Priority Data

| Jul. 2, 2004 | (JP) | ............................ 2004-196540 |
| Jul. 2, 2004 | (JP) | ............................ 2004-196543 |
| Jul. 26, 2004 | (JP) | ............................ 2004-216782 |
| Apr. 28, 2005 | (JP) | ............................ 2005-131985 |

(51) Int. Cl.
*G02B 7/02* (2006.01)
*G11B 7/00* (2006.01)

(52) U.S. Cl. ..................... 359/813; 359/819; 369/44.14

(58) Field of Classification Search ................ 359/811, 359/813, 814, 818, 819, 821, 822, 823; 369/44.11–44.16, 369/244.1

See application file for complete search history.

(56) References Cited

U.S. PATENT DOCUMENTS

| 5,566,156 | A | 10/1996 | Choi ........................... 720/634 |
| 5,805,554 | A | 9/1998 | Suzuki et al. ................ 720/612 |
| 6,137,759 | A | 10/2000 | Ogiro et al. ................ 369/75.1 |
| 6,362,927 | B1 * | 3/2002 | Hori ............................ 359/813 |
| 6,643,229 | B1 * | 11/2003 | Yamaguchi ............... 369/44.11 |
| 2001/0012257 | A1 | 8/2001 | Suzuki et al. .................. 369/94 |
| 2001/0015874 | A1 | 8/2001 | Hashimoto et al. ......... 360/133 |
| 2003/0090880 | A1 | 5/2003 | Wang et al. ................. 361/736 |
| 2003/0156529 | A1 * | 8/2003 | Tajiri ........................... 369/244 |
| 2005/0155047 | A1 * | 7/2005 | Kakuta et al. ............... 720/619 |

FOREIGN PATENT DOCUMENTS

| EP | 0547944 | 6/1993 |
| JP | 8339564 | 12/1996 |
| JP | 1097781 | 4/1998 |
| JP | 10221583 | 8/1998 |
| JP | 11224432 | 8/1999 |
| JP | 2001 134964 | 5/2001 |
| WO | 9820484 | 5/1998 |
| WO | 0116947 | 3/2001 |

* cited by examiner

*Primary Examiner*—Mohammed Hasan
(74) *Attorney, Agent, or Firm*—Stevens, Davis, Miller & Mosher, LLP

(57) ABSTRACT

An actuator device, an optical disk device and an information playback device comprising: an objective lens for focusing a light on a recording and/or playback face of a recording medium; a lens holder for holding the objective lens; a suspension for elastically supporting the lens holder; and an actuator base for supporting the suspension. The lens holder has a portion on the opposite side in the optical axis of the objective lens with respect to the actuator base.

18 Claims, 33 Drawing Sheets

TRACKING DIRECTION

— PRESENT EMBODIMENT (n1 = 1.45, n2 = 1.62)
------ COMPARISON (n1 = 1.62, n2 = 1.62)

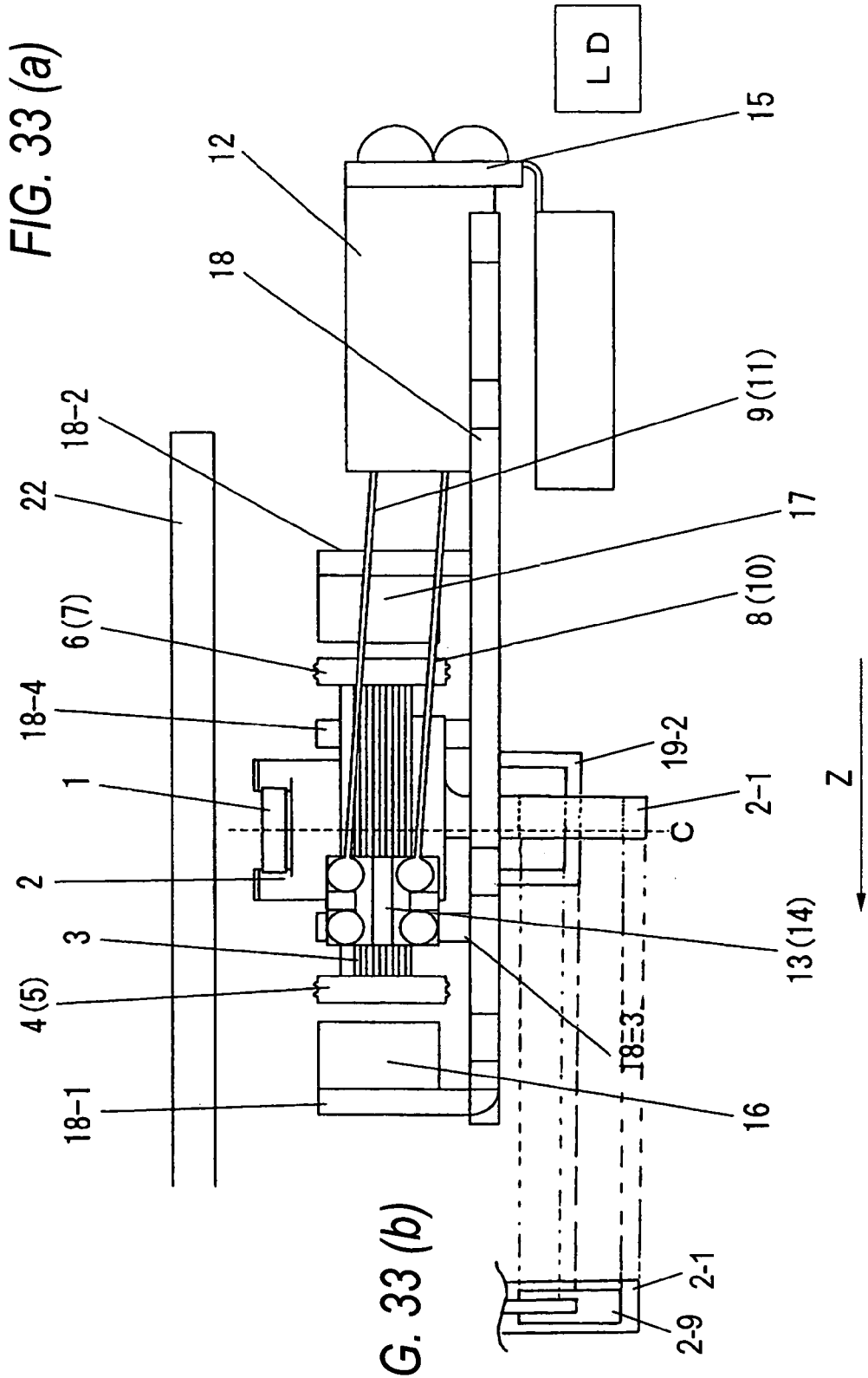

ACTUATOR DEVICE, OPTICAL DISK DEVICE, AND INFORMATION PLAYBACK DEVICE

BACKGROUND OF THE INVENTION

1. Field of the Invention

The present invention relates to an actuator device, an optical disk device and an information playback device, which are employed for recording and playing back an optical disk.

2. Description of the Related Art

In an actuator device of the prior art, a retaining protrusion, which is extended to a support side fixing portion of a flexible wiring board extended between an objective lens support and a base disposed on a chassis for feeding an electric current to the objective lens support, is formed at a position to engage with an engagement portion disposed on the base side.

In the configuration of the prior art described above, however, the objective lens support can be prevented from popping out of the chassis, but the actuator device or the optical disk device and the information playback device having the actuator device mounted thereon may be broken by the deformation of suspension wire or the like.

SUMMARY OF THE INVENTION

In order to solve the aforementioned problem of the prior art, the invention contemplates to provide a configuration comprising: an objective lens for focusing a light on a recording and/or playback face of a recording medium; a lens holder for holding the objective lens; a suspension for elastically supporting the lens holder; and an actuator base for supporting the suspension. The lens holder has a portion on the opposite side in the optical axis of the objective lens with respect to the actuator base.

According to this configuration, it is possible to provide an actuator device, an optical disk device and an information playback device, which are hardly broken.

BRIEF DESCRIPTION OF THE DRAWINGS

FIG. 33 is a side elevation showing an actuator device in Embodiment 1.

DESCRIPTION OF THE PREFERED EMBODIMENTS (Embodiment 1)

Figure 1:
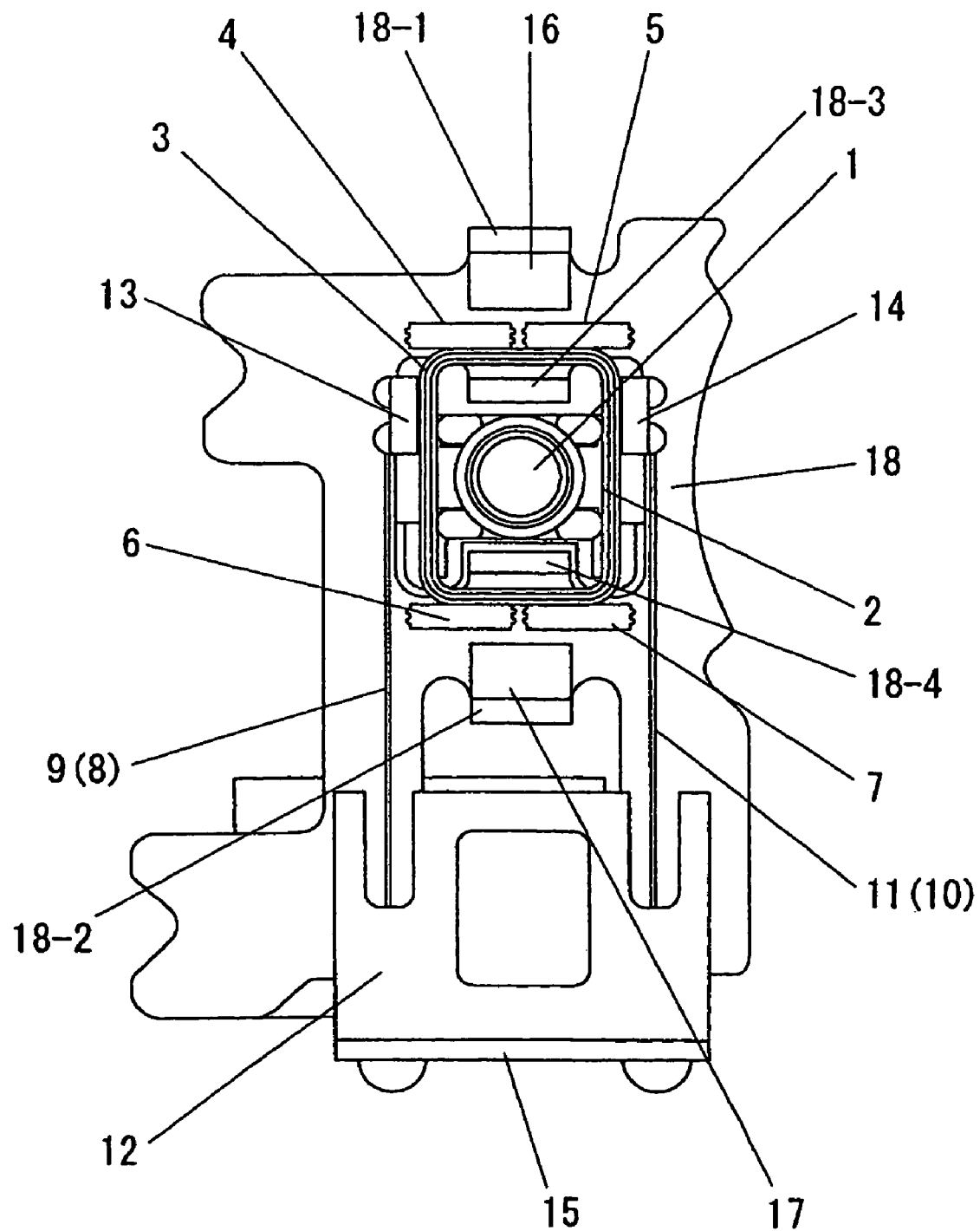
FIG. 1 is a front elevation showing an actuator device in Embodiment 1.
Figure 2:
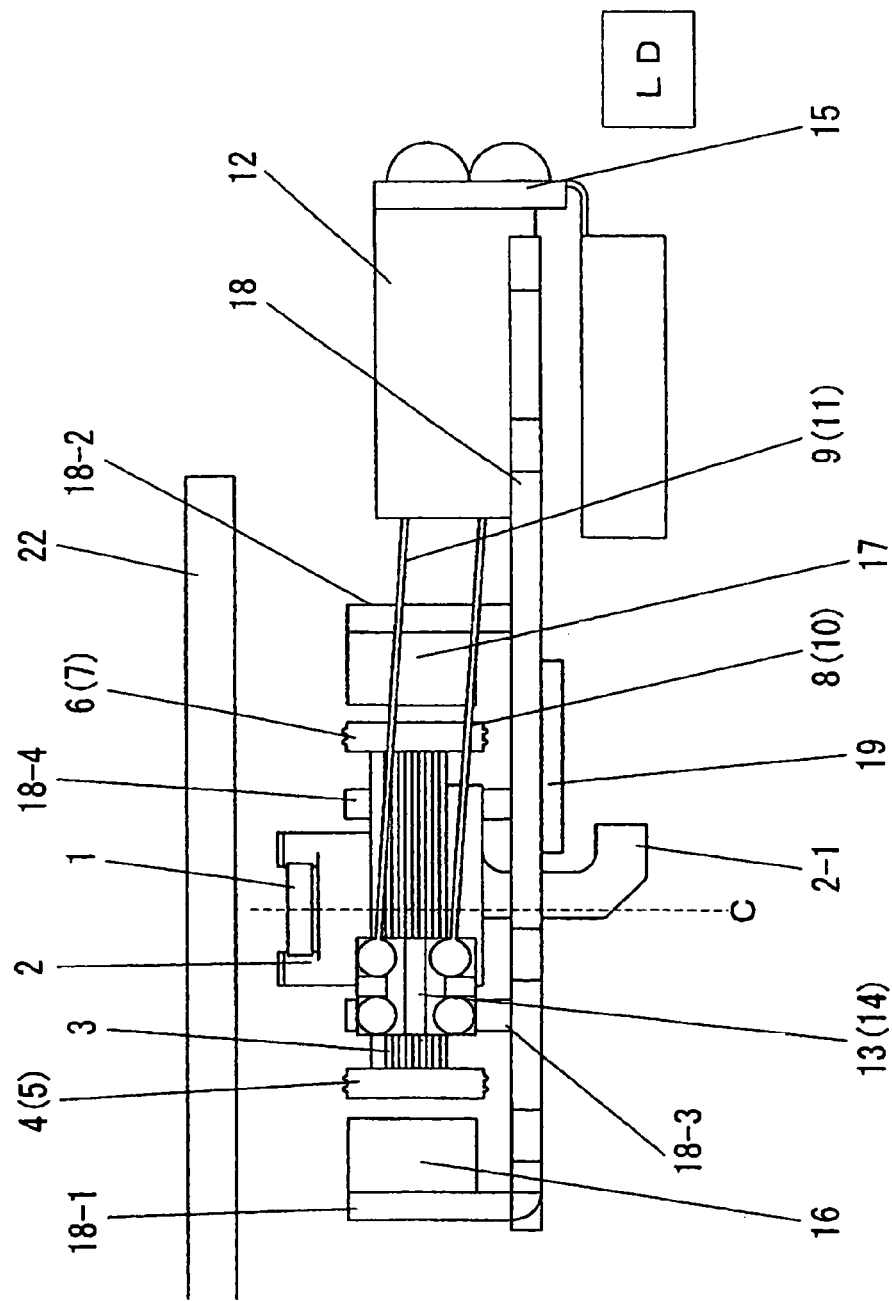
FIG. 2 is a side elevation showing an actuator device in Embodiment 1.
Figure 3:
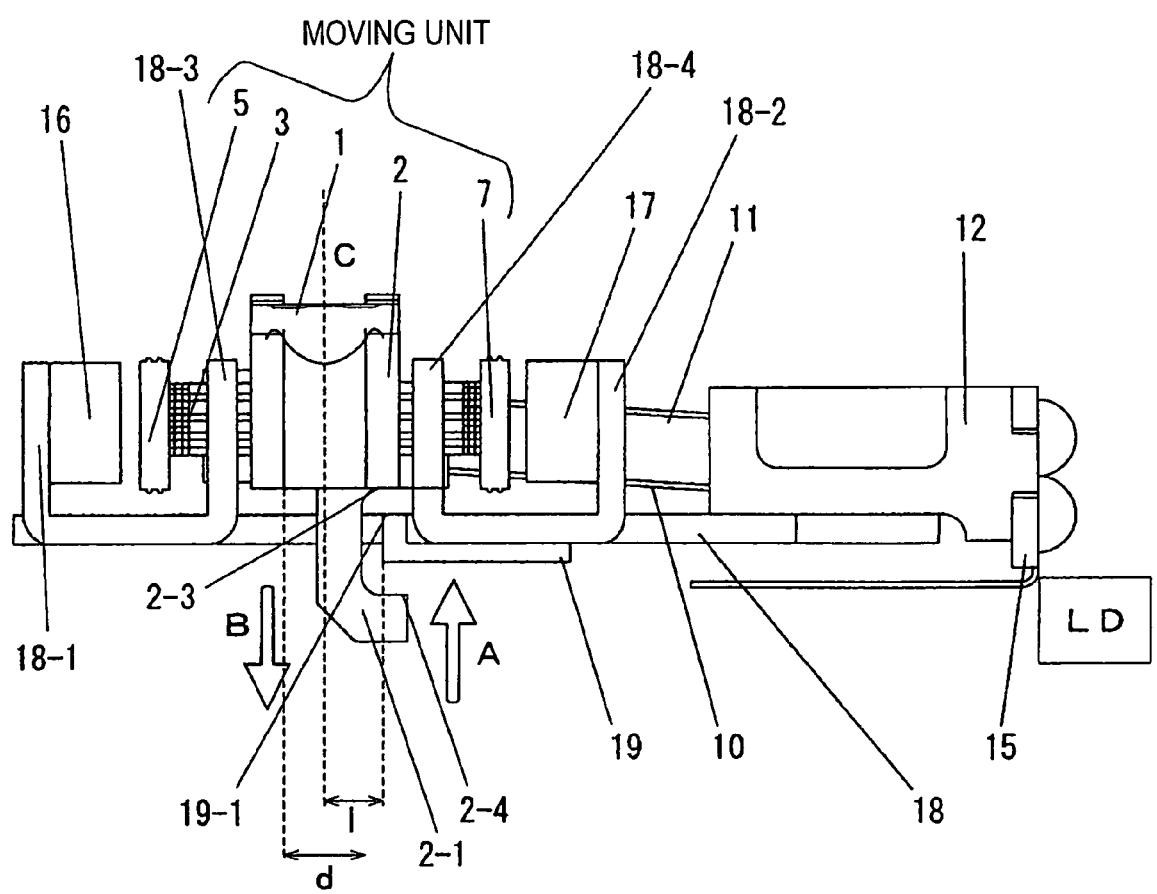
FIG. 3 is a sectional view showing the actuator device in Embodiment 1 and taken in a tangential direction containing an objective lens optical axis.
Figure 4:
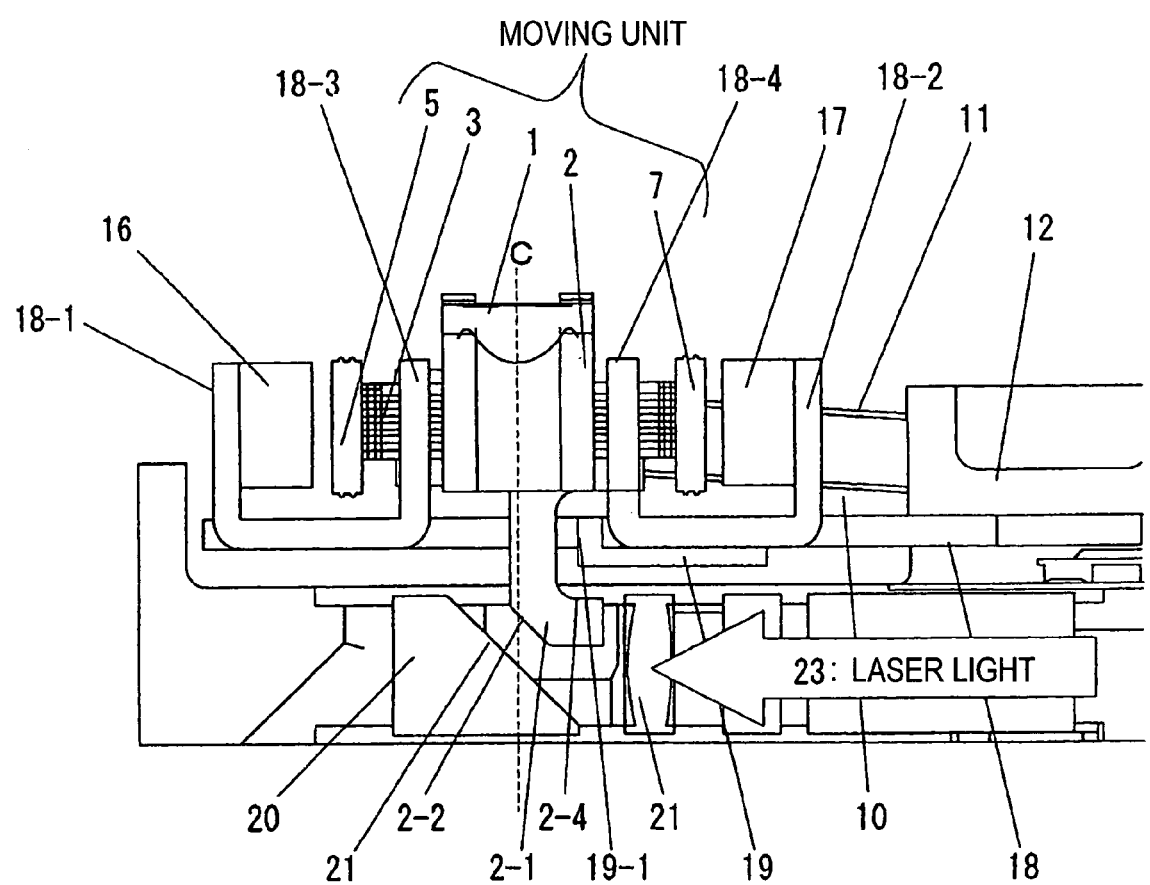
FIG. 4 is a sectional view of a pickup device utilizing the actuator device in Embodiment 1.
Figure 5:
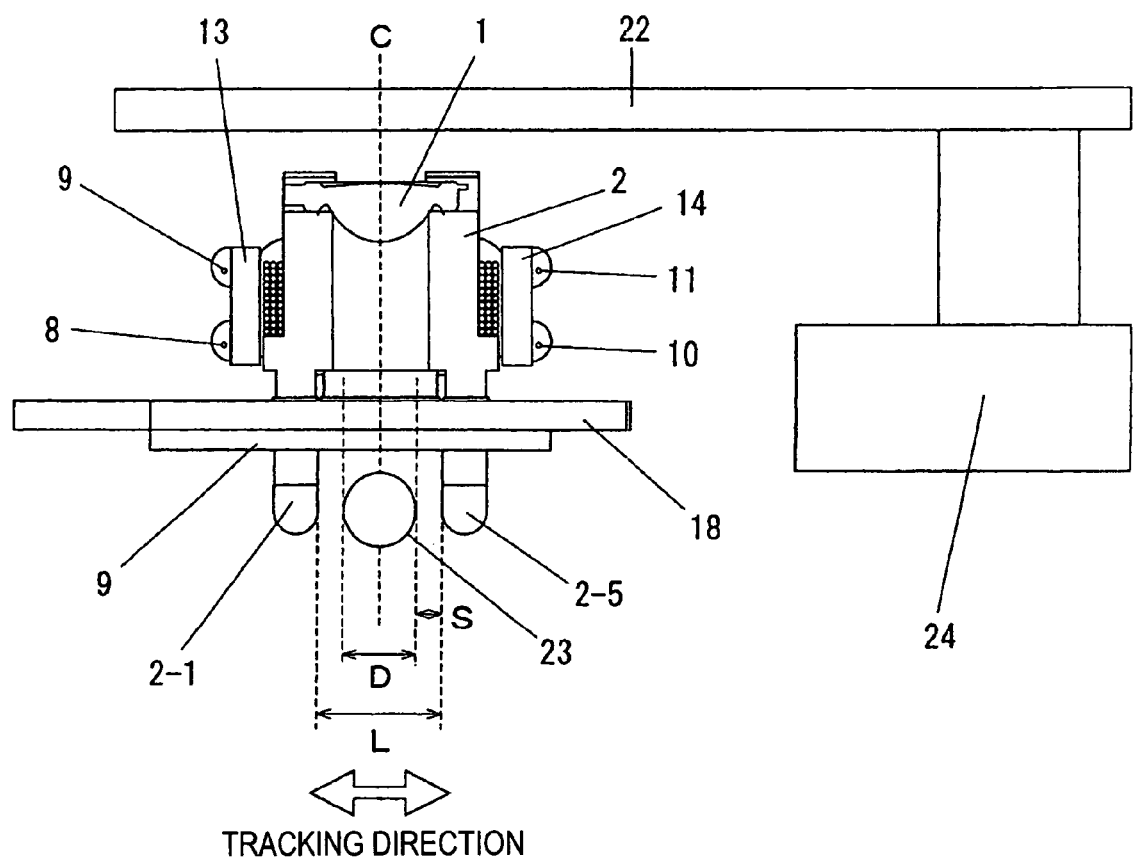
FIG. 5 is a sectional view showing the actuator device in Embodiment 1 and taken in tracking directions containing an objective lens optical axis.

An actuator device in Embodiment 1 is described in the following with reference to the accompanying drawings. FIG. 1 is a front elevation showing an actuator device in Embodiment 1; FIG. 2 is a side elevation showing an actuator device in Embodiment 1; FIG. 3 is a sectional view showing the actuator device in Embodiment 1 and taken in a tangential direction containing an objective lens optical axis; FIG. 4 is a sectional view of a pickup device utilizing the actuator device in Embodiment 1; and FIG. 5 is a sectional view showing the actuator device in Embodiment 1 and taken in tracking directions containing an objective lens optical axis.

In FIG. 1 and FIG. 2, reference numeral 1 designates an objective lens for focusing a laser light from a laser diode (as will be abbreviated into the "LD") on an optical disk 22 and for guiding the light reflected on the optical disk 22 into the light sensor. Numeral 2 designates a lens holder for fixing the objective lens 1 by means of adhesive or the like. Numeral 3 designates a focusing coil is so fixed on the lens holder 2 by means of adhesive or the like as may take a substantially symmetric position on the optical axis of the objective lens 1. Numerals 4, 5, 6 and 7 designate tracking coils, which are individually wound substantially in ring shapes like the focusing coil 3. The tracking coils 4, 5, 6 and 7 are so fixed on the focusing coil 3 by means of adhesive or the like as may take substantially symmetric positions on the optical axis of the objective lens 1. Numerals 13 and 14 designate suspension bases, which are fixed on the focusing coil 3 by means of adhesive or the like. The focusing coil 3 is fixed at its terminal on the suspension base 13 by means of solder or the like, and the tracking coils 4, 5, 6 and 7 electrically connected in series are connected at their terminals with the suspension base 14 by means of solder or the like.

Numerals 8, 9, 10 and 11 designate suspension wires. Of these, the suspension wires 8 and 9 are connected by means of solder or the like to the suspension base 13 and an electric board 15 adhered in advance to a suspension holder 12 by means of adhesive or the like. Moreover, the suspension wires 10 and 11 are connected by means of solder or the like to the suspension base 14 and the electric board adhered in advance to the suspension holder 12 by means of adhesive or the like. At least the lens holder 2 can be displaced within a predetermined range with respect to the suspension holder 12.

In this embodiment, the suspension wires 8, 9, 10 and 11 are soldered to the suspension bases 13 and 14 fixed on the lens holder 2 and at their other ends to the electric board 15. However, the lens holder 2 and/or the suspension holder 12 may be fixed by an insert molding method.

Moreover, the suspension wires 8, 9, 10 and 11 are made of round wires, leaf springs or the like so that they may feed an electric power to the focusing coil 3 and to the tracking coils 4, 5, 6 and 7 jointed in series.

Numerals 16 and 17 designate magnets, which are fixed by means of adhesive or the like to yokes 18-1 and 18-2, respectively. In this embodiment, the magnet 16 and the yokes 18-1, 18-3 and 18 constitute one magnetic circuit, and the magnet 17 and the yokes 18-2, 18-4 and 18 constitute one magnetic circuit. Thrusts in focusing directions and in the tracking directions are established by arranging the focusing coil 3 and the tracking coils 4 and 5 between the magnet 16 and the yoke 18-3 and by likewise arranging the focusing coil 3 and the tracking coils 6 and 7 between the magnet 17 and the yoke 18-4. The suspension holder 12 is fixed on the yoke 18 by means of adhesive or the like. The actuator is constituted of the two magnetic circuits in this embodiment but may also be constituted of one magnetic circuit. The assembly of the yoke 18 and the suspension holder 12 will be hereinafter called the "actuator base". The invention can also be practiced by constituting the yoke 18 and the suspension holder 12 integrally into the actuator base.

A protrusion 2-1 and a stopper 19 are described with reference to FIG. 3, FIG. 4 and FIG. 5. The protrusion 2-1 may be constituted integrally with the lens holder 2 or may be prepared as another part and attached to the lens holder 2 by an adhering method or the like. Thus, the component including the protrusion 2-1, which is prepared as another part and attached to a lens holder 2, is called the "lens holder 2". The protrusion 2-1 includes an arm and a leading end 2-4.

A moving unit, which is constituted of the objective lens 1, the lens holder 2, the focusing coil 3 and the tracking coils 4, 5, 6 and 7, is so constituted as is driven a predetermined stroke by the magnetic circuit in the focusing directions (i.e., a direction A and a direction B of FIG. 3) and in the tracking directions. In case impacts are applied from the outside, therefore, the moving unit is supposed to move over a predetermined shift, and the suspension wires 8, 9, 10 and 11 may be deformed. It is, therefore, necessary to confine the range for the moving unit to move, so that the suspension wires 8, 9, 10 and 11 may not be deformed even in case the impacts are applied from the outside to disconnect the servo. In order to confine the range especially in the direction A of the focusing directions, in Embodiment 1, the lens holder 2 is provided, on the side opposite to the objective lens mounting portion, with the protrusion 2-1 which functions as a retained portion to be retained on the stopper 19. In case the moving unit moves in the direction A over a predetermined moving range, the leading end 2-4 of the protrusion 2-1 is retained by the stopper 19 attached to the yoke 18 by means of adhesive or the like, thereby to regulate the moving range of the moving unit. As a result, it is possible to realize the actuator device, which is hardly influenced by the impacts applied from the outside. Moreover, the assemblability of the device can be improved by positioning and attaching the stopper 19 in the assembling procedure after the lens holder 2 and the actuator base were assembled.

In this embodiment, the stopper 19 is made of a metallic material such as aluminum but should not be limited thereto. The invention can also be practiced by making the stopper of a soft material such as a resin. Alternatively, the stopper 19 can be made by applying a soft material such as a resin to the metallic material or the like. The impacts at the instant when the protrusion 2-1 abuts against the stopper 19 can be absorbed by using the soft material such as the resin.

As shown in FIG. 4, on the other hand, the position of the protrusion 2-1 in the tangential direction is displaced from the optical axis C of the objective lens 1 toward the LD. With is configuration, the stopper 19 can be arranged on the back of the yoke 18, and the leading end 2-4 of the protrusion 2-1 of the lens holder 2 can be arranged between the yoke 18 and a rising mirror 20 and just in front of a reflecting surface 21 of the rising mirror 20. Thus, the optical pickup module can be thinned to realize a large-sized, optically excellent actuator device.

Moreover, the stopper 19 is so held in the yoke 18 as to satisfy relations of $1 \geq d/2$, if a luminous flux to be incident on the objective lens 1 is designated by d and if the distance between the optical axis C and the leading end 19-1 of the stopper 19 is designated by l. Moreover, the stopper 19 has its outer edge shaped straight on the side to be retained by the protrusion 2-1 and a protrusion 2-5 and arranged substantially in parallel with the tracking directions. With this configuration, it is possible to realize the small-sized, optically excellent actuator device having a simple configuration while preventing the luminous flux to be incident on the objective lens 1 from being shielded by the stopper 19.

Moreover, a surface 2-2 of the protrusion 2-1 of the lens holder 2 to confront the rising mirror 20 is made substantially parallel to the reflecting surface 21 of the rising mirror 20. With this configuration, it is possible realize the small-sized, optically excellent actuator device.

On the other hand, the moving range of the moving unit in the direction B of the focusing directions is confined by the retention between the bottom surface 2-3 of the lens holder 2 and the leading end 19-1 of the stopper 19.

FIG. 5 is a sectional view showing the actuator device in Embodiment 1 and taken in the tracking directions containing the objective lens optical axis. FIG. 5 shows the optical disk 22 and a spindle motor 24, too, as will be described hereinafter.

In Embodiment 1, as shown in FIG. 5, the protrusion of the lens holder 2 is composed of the two protrusions 2-1 and 2-5. The protrusion 2-1 and the protrusion 2-5 are split transversely of the optical axis so that they do not obstruct the luminous flux of a laser light 23. Moreover, the protrusion 2-1 and the protrusion 2-5 are arranged at transversely symmetric positions with respect to the optical axis C so that the position of the center of gravity of the moving unit in the tracking directions can be made substantially aligned to the optical axis C. Thus, it is possible to configure the actuator having excellent tilting characteristics. Moreover, the protrusion 2-1 and the protrusion 2-5 are configured to have identical shapes so that the position of the center of gravity of the moving unit in the tracking directions can be made substantially aligned to the optical axis C. Thus, it is possible to configure the actuator having excellent tilting characteristics. Moreover, the configuration is made to satisfy relations of $L \geqq D+2 \times S$, if the gap between the protrusion 2-1 and the protrusion 2-5 is designated by L, if the luminous flux of the laser light 23 to be incident on the rising mirror 20 or the reflected light (although not shown) from the rising mirror has a diameter D, and if the moving unit has a shift S in the tracking directions. Therefore, the protrusion 2-1 or the protrusion 2-5 does not obstruct the luminous flux of the laser light 23, even in case the moving unit shifts in the tracking directions. Thus, it is possible to realize the actuator device having the excellent optical characteristics. By adjusting the thickness, the width and the height of the protrusion 2-1 and the protrusion 2-5, the position of the center of gravity of the moving unit can be adjusted to be identical to the drive point of the magnetic circuit. Thus, it is possible to realize the actuator device having the excellent tilting characteristics.

Here, the lens holder 2 is provided with the two protrusions, but the invention can also be practiced by providing three or more protrusions.

In FIG. 5, moreover, the numeral 22 designates the optical disk, which can perform at least one of the playback and the recording of information when irradiated with a light. The optical disk 22 is preferably exemplified by: a CD-ROM disk, a DVD-ROM disk or the like capable only of playing back the information; a CD-R disk, a DVD-R disk or the like capable of not only playing back the information but also recording the information and the CD-RW disk, the DVD-RW disk, the DVD-RAM disk or the like capable of not only the playing back the information but also recording/erasing the information. On the other hand, the optical disk 22 to be employed is: one provided with a recording layer capable of at least recording and playing back the information with a substantially red light; one provided with a recording layer capable of recording or playing back the information with a substantially red light; and one provided with a recording layer capable of recording or playing back the information with a substantially blue to bluish violet light. Moreover, the optical disk 22 can be exemplified by a disk shape sized to have various diameters, preferably by a disk sized to have a diameter of 3 cm to 12 cm.

In FIG. 5, the numeral 24 designates the spindle motor for turning the optical disk 22. This spindle motor 24 is provided with the (not-shown) chucking portion for holding the optical disk 22. The spindle motor 24 can turn the optical disk 22 at a constant angular velocity or at a variable angular velocity. How to control the angular velocity to the constant or variable value is switched according to the situations by the spindle motor drive means or the control unit of the optical disk device, although not shown. In this embodiment, the turning drive means of the optical disk 22 is exemplified by the spindle motor 24, but the optical disk 22 may also be turned by a motor of another kind or another means.

In Embodiment 1, the protrusion 2-1 is formed substantially into an "L"-shape. However, the invention can also be practiced by forming a through hole 2-9 in the protrusion 2-1 so that a stopper member 19-2 may extend through the through hole 2-9, as shown in FIG. 33A and FIG. 33B. The protrusion 2-1 and the stopper member 19-2 of FIG. 33A are shown in FIG. 33B, as presented in FIG. 33B, as taken in a direction Z. With this configuration, the stopper member 19-2 is brought into abutment against the upper and lower inner faces of the through hole 2-9 of the protrusion 2-1, in case high impacts are applied from the outside. As a result, the movements of the lens holder 2 in the focusing directions can be regulated to prevent the actuator device from being broken.

(Embodiment 2)

Figure 6:
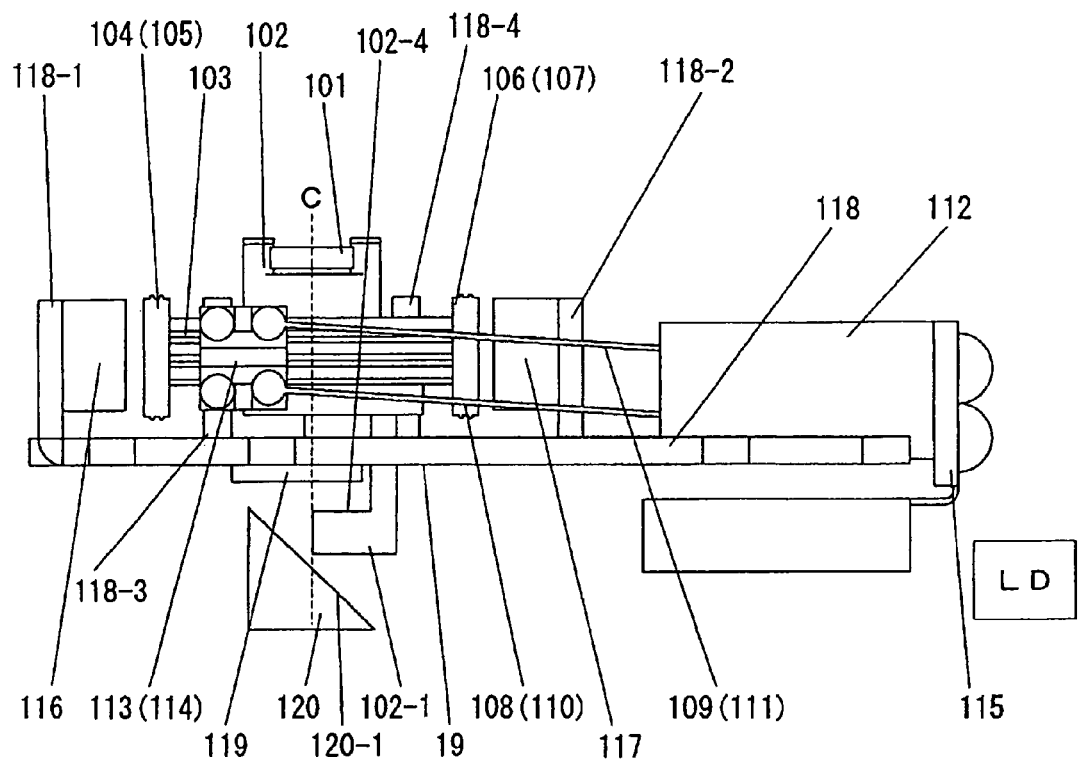
FIG. 6 is a front elevation showing an actuator device in Embodiment 1.

Next, an actuator device in Embodiment 2 will be described with reference to FIG. 6 to FIG. 8.

Reference numeral 101 designates an objective lens having roles to focus a laser light from a laser diode (as will be abbreviated into the "LD") on the disk (although not shown) and to guide the reflected light into the light sensor. Numeral 102 designates a lens holder for fixing the objective lens 101 by means of adhesive or the like.

Numeral 103 designates a focusing coil is so fixed on the lens holder 102 by means of adhesive or the like as may take a substantially symmetric position on the optical axis of the objective lens 101. Numerals 104, 105, 106 and 107 designate tracking coils, which are individually wound substantially in ring shapes like the focusing coil 103. The tracking coils 104, 105, 106 and 107 are so fixed on the focusing coil 103 by means of adhesive or the like as may take substantially symmetric positions on the optical axis of the objective lens 101.

Numerals 113 and 114 designate suspension bases, which are fixed on the focusing coil 103 by means of adhesive or the like. The focusing coil 103 is fixed at its terminal on the suspension substrate 113 by means of solder or the like, and the tracking coils 104, 105, 106 and 107 electrically connected in series are connected at their terminals with the suspension substrate 114 by means of solder or the like.

Numerals 108, 109, 110 and 111 designate suspension wires. Of these, the suspension wires 108 and 109 are connected by means of solder or the like to the suspension substrate 113 and an electric board 115 adhered in advance to a suspension holder 112 by means of adhesive or the like. Moreover, the suspension wires 110 and 111 are connected by means of solder or the like to the suspension substrate 114 and the electric board adhered in advance to the suspension holder 112 by means of adhesive or the like. At least the lens holder 102 can be displaced within a predetermined range with respect to the suspension holder 112.

In this embodiment, the suspension wires 108, 109, 110 and 111 are soldered to the suspension substrates 113 and 114 fixed on the lens holder 102 and at their other ends to the electric board 115. However, the lens holder 102 and/or the suspension holder 112 may be fixed by an insert molding method. Moreover, the suspension wires 108, 109, 110 and 111 are made of round wires, leaf springs or the like so that they may feed an electric power to the focusing coil 103 and to the tracking coils 4, 5, 6 and 7 jointed in series.

Numerals 116 and 117 designate magnets, which are fixed by means of adhesive or the like to yokes 118-1 and 118-2, respectively. In this embodiment, the magnet 116 and the yokes 118-1, 118-3 1 and 18 constitute one magnetic circuit, and the magnet 117 and the yokes 118-2, 118-4 and 118 constitute one magnetic circuit. Thrusts in focusing directions and in the tracking directions are established by arranging the focusing coil 103 and the tracking coils 104 and 105 between the magnet 116 and the yoke 118-3 and by likewise arranging the focusing coil 103 and the tracking coils 106 and 107 between the magnet 117 and the yoke 118-4. The suspension holder 112 is fixed on the yoke 118 by means of adhesive or the like. The actuator is constituted of the two magnetic circuits in this embodiment but may also be constituted of one magnetic circuit.

A protrusion 102-1 and a stopper 119 are described in the following. A moving unit, which is constituted of the objective lens 101, the lens holder 102, the focusing coil 103 and the tracking coils 104, 105, 106 and 107, is so constituted as is driven a predetermined stroke by the magnetic circuit in the focusing directions and in the tracking directions. In case impacts are applied from the outside, therefore, the moving unit is supposed to move over a predetermined shift, and the suspension wires 108, 109, 110 and 111 may be deformed. It is, therefore, necessary to confine the range for the moving unit to move, so that the suspension wires 108, 109, 110 and 111 may not be deformed even in case the impacts are applied from the outside to disconnect the servo. In order to confine the range especially in the focusing directions, in Embodiment 2, the lens holder 102 is provided, on the side opposite to the objective lens mounting portion, with the protrusion 102-1. In case the moving unit moves in the focusing directions over a predetermined moving range, the leading end 2-4 of the protrusion 102-1 is retained by the stopper 119 attached to the yoke 118 by means of adhesive or the like, thereby to regulate the moving range of the moving unit. As a result, it is possible to realize the actuator device which is hardly influenced by the impacts applied from the outside.

In Embodiment 2, the stopper 119 is made of a material such as glass for transmitting the LD light and is so fixed on the yoke 118 by means of adhesive or the like as permits the entire luminous flux incident on the objective lens 101 to pass through the stopper 119. On the other hand, the position of the protrusion 102-1 is displaced from the optical axis C of the objective lens 101 toward the LD. With is configuration, the stopper 119 can be arranged on the back of the yoke 118, and the leading end 102-4 of the protrusion 102-1 of the lens holder 102 can be arranged between the yoke 118 and a rising mirror 120 and just in front of a reflecting surface 120-1 of the rising mirror 120. Thus, the optical pickup module can be thinned to realize a large-sized, optically excellent actuator device.

Figure 7:
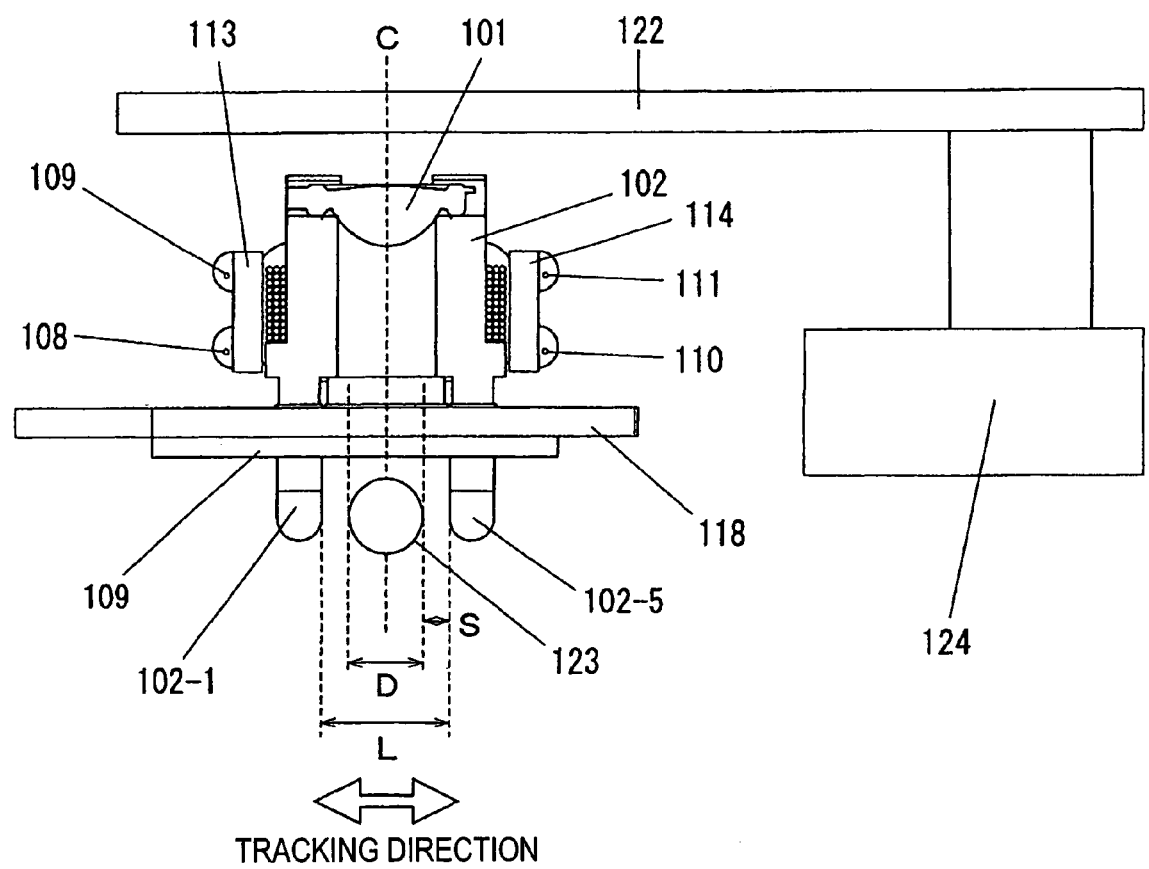
FIG. 7 is a sectional view showing the actuator device in Embodiment 2 and taken in the tracking directions containing an objective lens optical axis.
Figure 8:
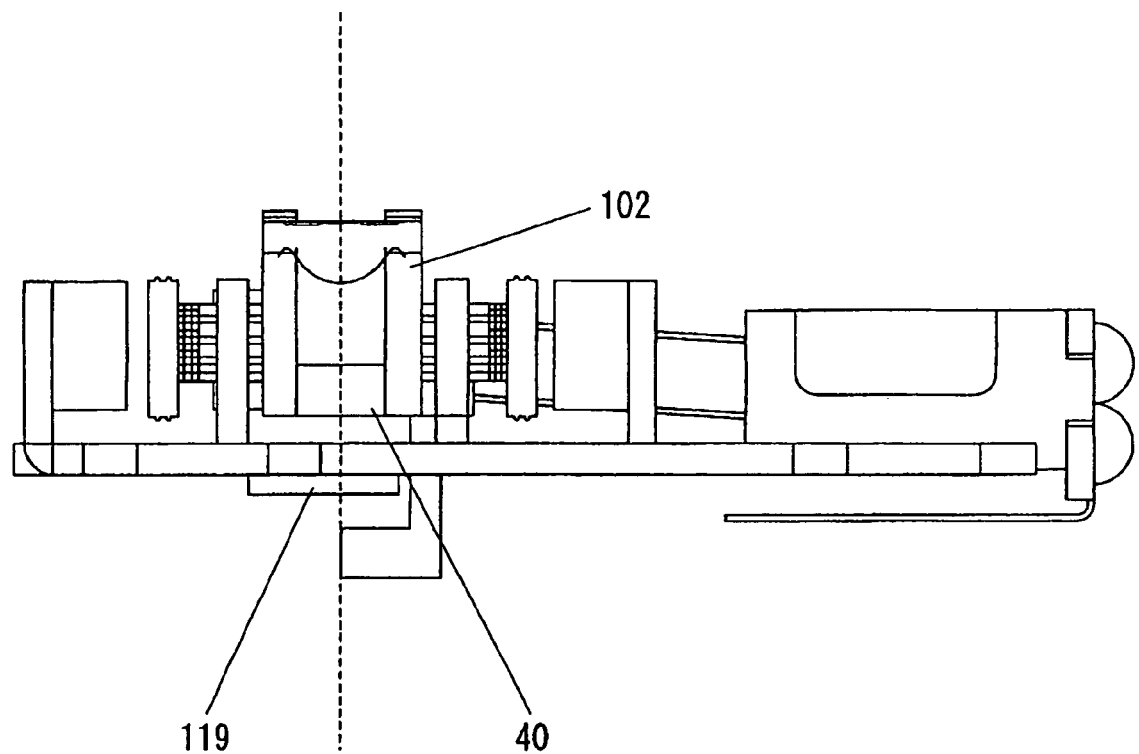
FIG. 8 is a sectional view showing the actuator device in Embodiment 2 and taken in a tangential direction containing an objective lens optical axis.

FIG. 7 is a sectional view showing the actuator device in Embodiment 2 and taken in the tracking directions containing the objective lens optical axis. FIG. 7 shows the optical disk 122 and a spindle motor 124, too, as will be described hereinafter.

In this embodiment, as shown in FIG. 7, the protrusion of the lens holder 102 is composed of the two protrusions 102-1 and 102-5. The protrusion 102-1 and the protrusion 102-5 are split transversely of the optical axis so that they do not obstruct the luminous flux of a laser light 123. Moreover, the protrusion 102-1 and the protrusion 102-5 are arranged at transversely symmetric positions with respect to the optical axis C so that the position of the center of gravity of the moving unit in the tracking directions can be made substantially aligned to the optical axis C. Thus, it is possible to configure the actuator having excellent tilting characteristics. Moreover, the protrusion 102-1 and the protrusion 102-5 are configured to have identical shapes so that the position of the center of gravity of the moving unit in the tracking directions can be made substantially aligned to the optical axis C. Thus, it is possible to configure the actuator having excellent tilting characteristics.

Moreover, the configuration is made to satisfy relations of $L \geq D + 2 \times S$, if the gap between the protrusion 102-1 and the protrusion 102-5 is designated by L, if the luminous flux of the laser light 123 to be incident on the rising mirror 120 or the reflected light (although not shown) from the rising mirror has a diameter D, and if the moving unit has a shift S in the tracking directions. Therefore, the protrusion 102-1 or the protrusion 102-5 does not obstruct the luminous flux of the laser light 123, even in case the moving unit shifts in the tracking directions. Thus, the actuator device having the excellent optical characteristics is realized. By adjusting the thickness, the width and the height of the protrusion 102-1 and the protrusion 102-5, the position of the center of gravity of the moving unit can be adjusted to be identical to the drive point of the magnetic circuit. Thus, it is possible to realize the actuator device having the excellent tilting characteristics.

In Embodiment 2, the stopper 119 is made of a material such as glass for transmitting the LD light. However, the invention can also be practiced by making the stopper 119 of a quarter wavelength plate or a collimator lens. This makes it possible to reduce the number of parts and the size of the device. Moreover, the invention can also be practiced by making the stopper 119 of the collimator lens and by holding a quarter-wavelength plate 40, as shown in FIG. 8. As a result, the parts can be integrated to reduce the size of the optical pickup device utilizing the actuator device of Embodiment 2.

(Embodiment 3)

Next, an actuator device in Embodiment 3 will be described with reference to FIG. 9 to FIG. 19. Of the members shown in FIG. 9 to FIG. 19, the members, which are designated by the same numerals as those of the members described in Embodiment 1 with reference to FIG. 1 to FIG. 5, are omitted on their descriptions, because they have substantially identical configurations and functions although more or less different in their shapes.

Figure 9:
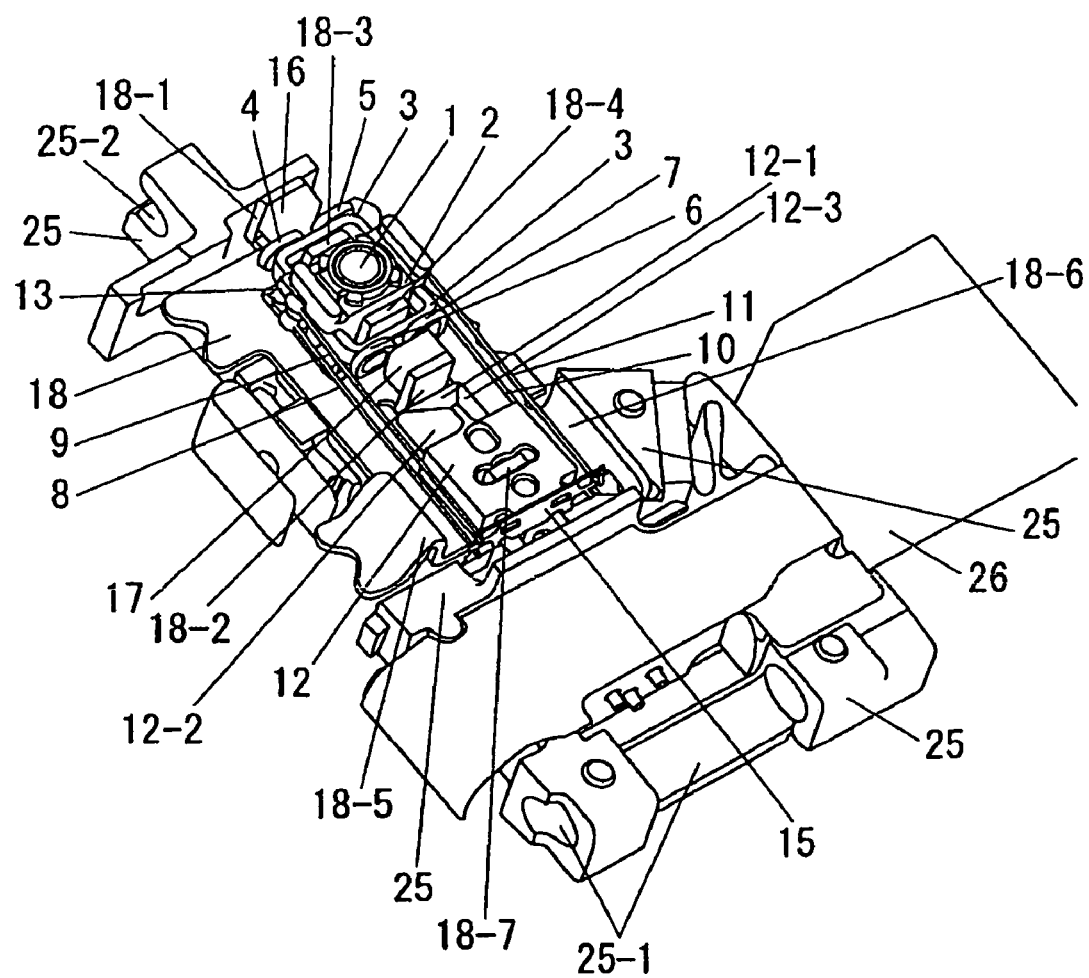
FIG. 9 is a perspective view showing an optical pickup module having an actuator device in Embodiment 3 mounted thereon.
Figure 10:
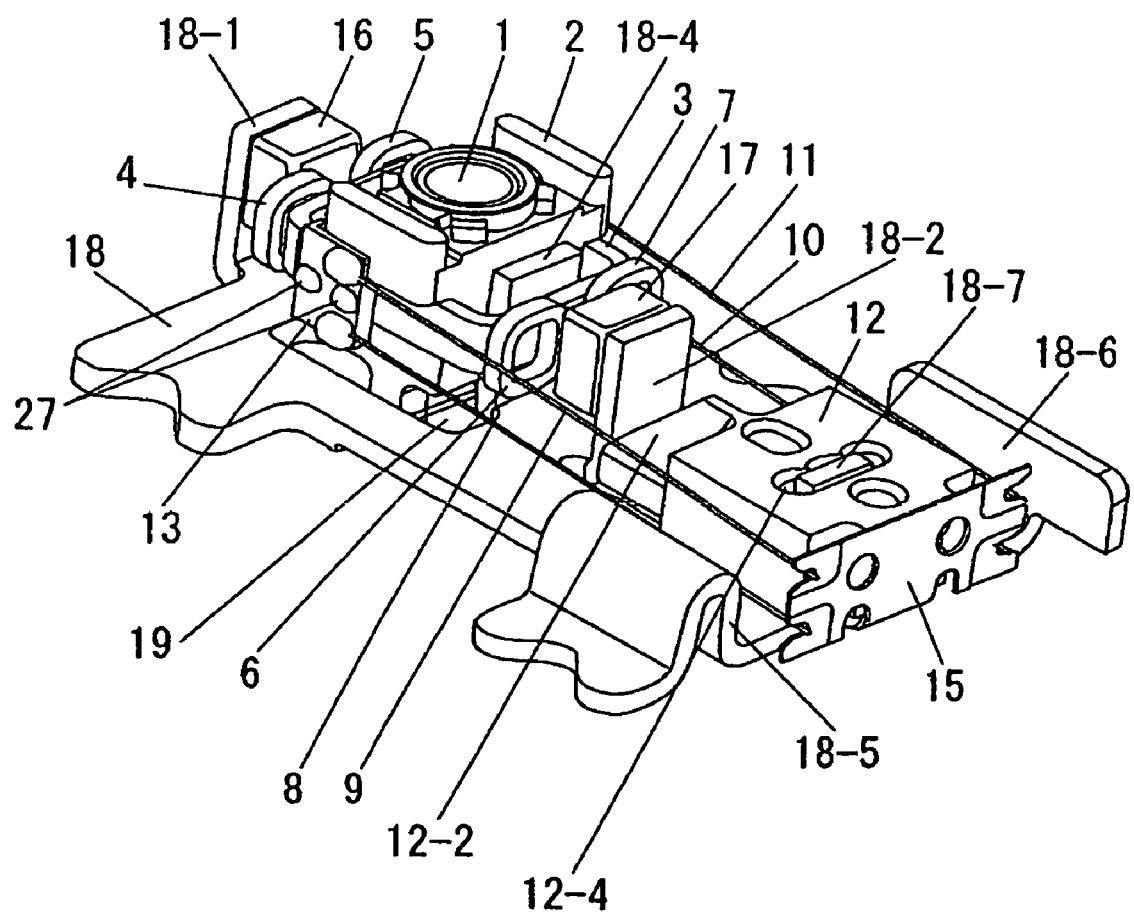
FIG. 10 is a perspective view showing the actuator device in Embodiment 3.
Figure 11:
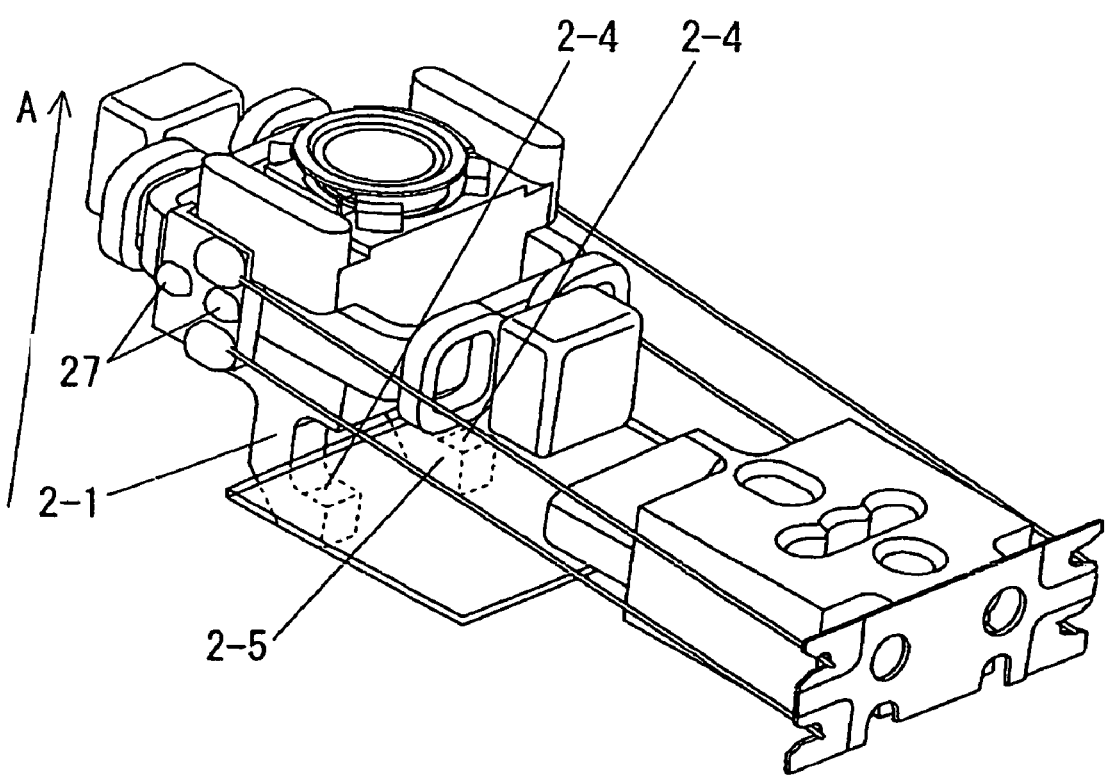
FIG. 11 is a schematic view showing the actuator device in Embodiment 3.
Figure 12:
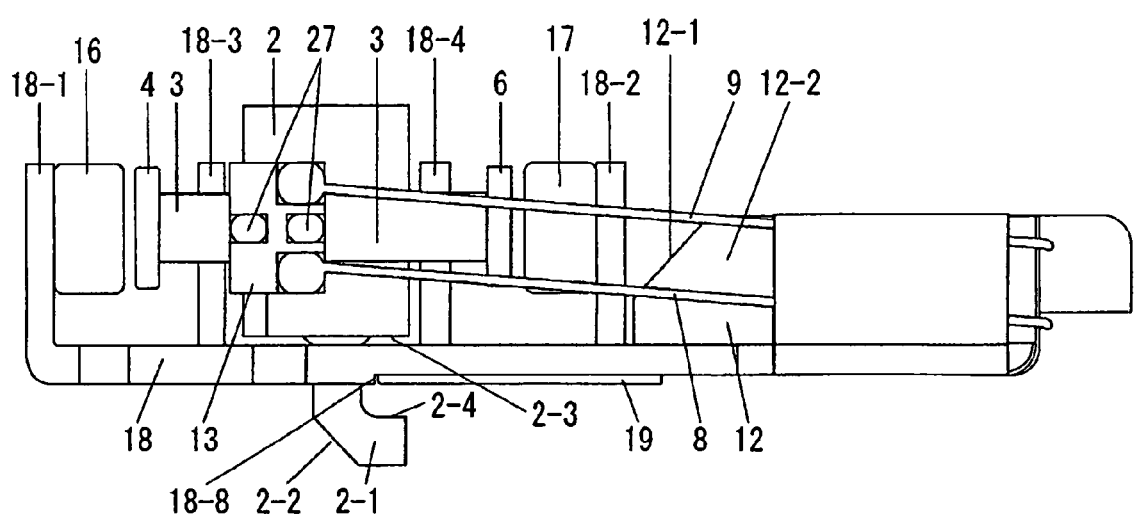
FIG. 12 is a side elevation showing the actuator device in Embodiment 3.
Figure 13:
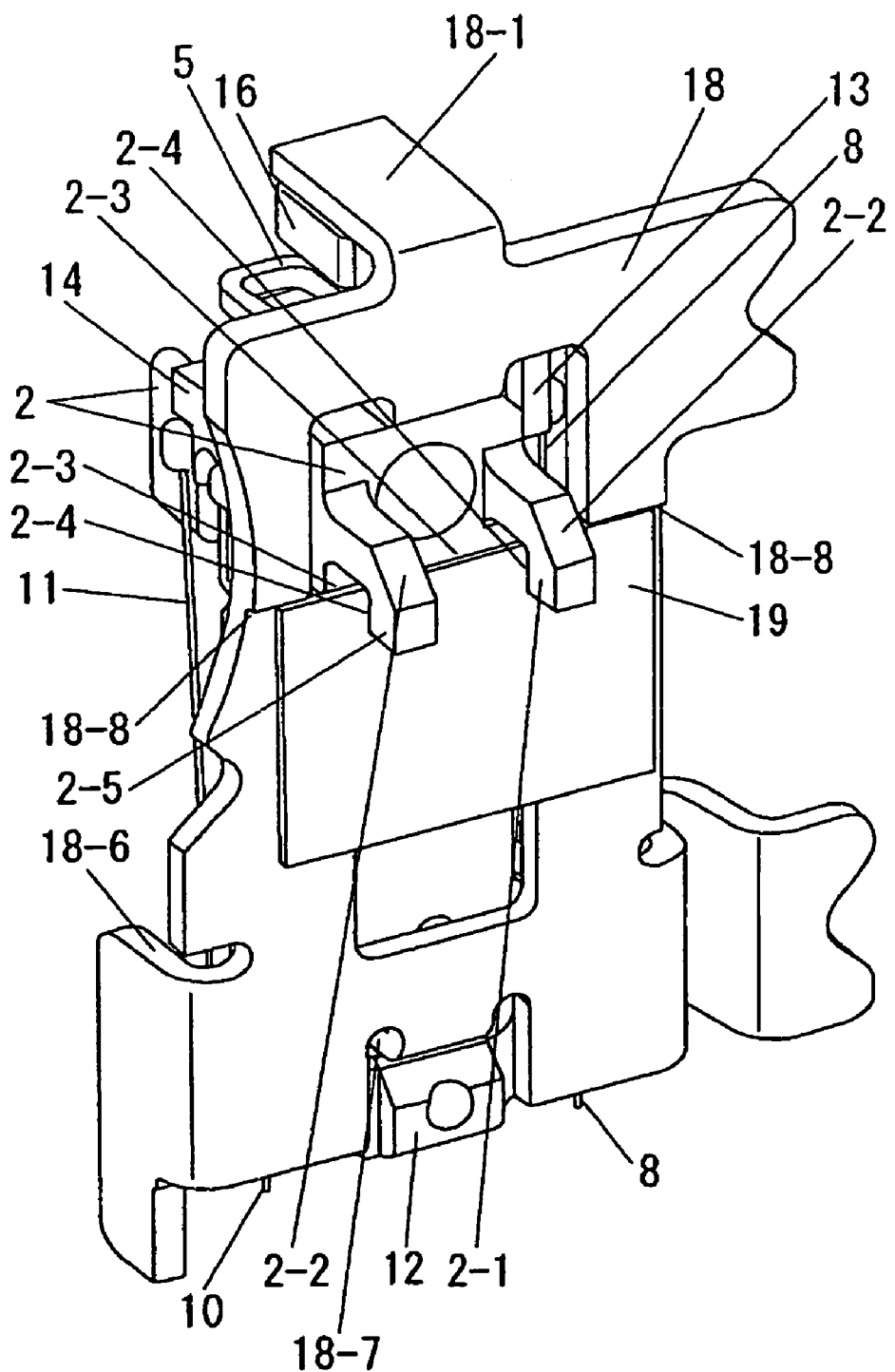
FIG. 13 is a perspective view showing the actuator device in Embodiment 3.
Figure 14:
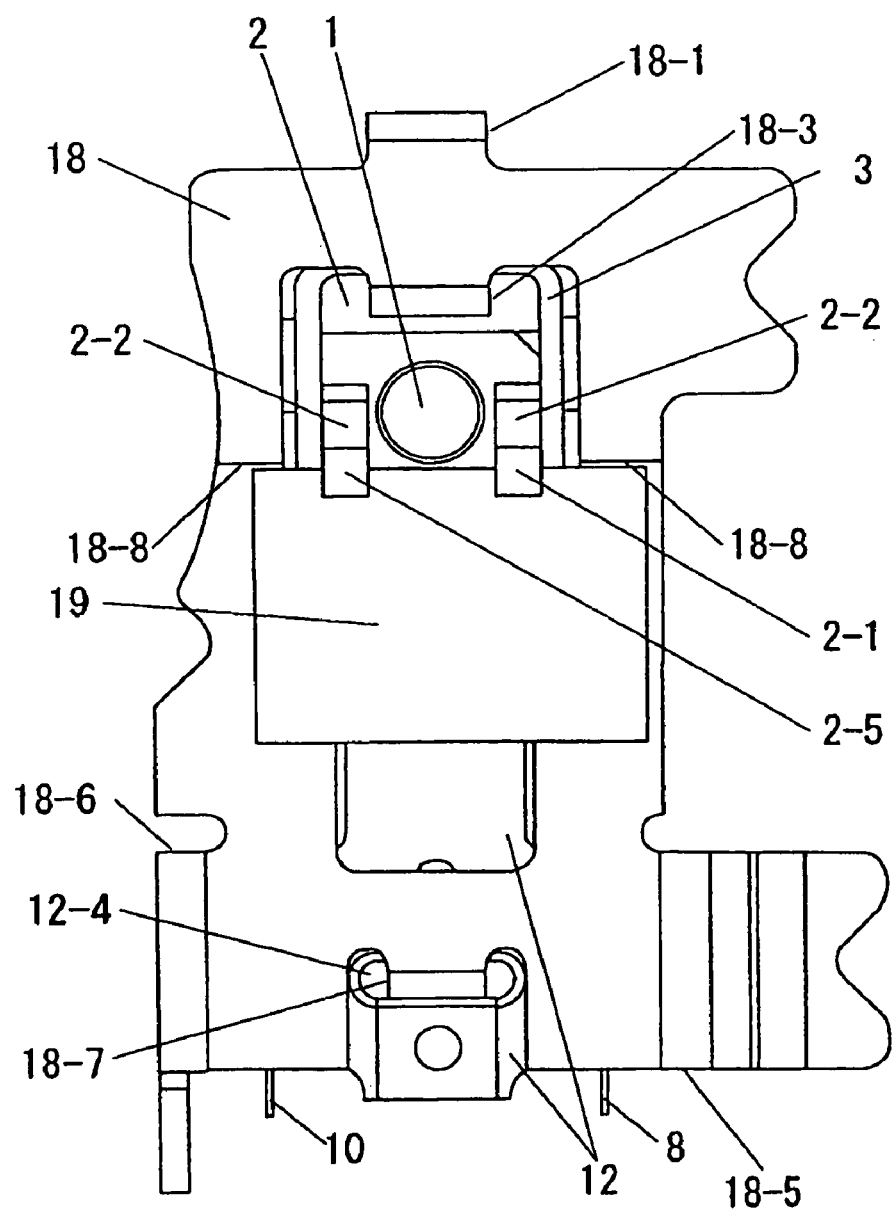
FIG. 14 is a back elevation showing the actuator device in Embodiment 3.
Figure 15:
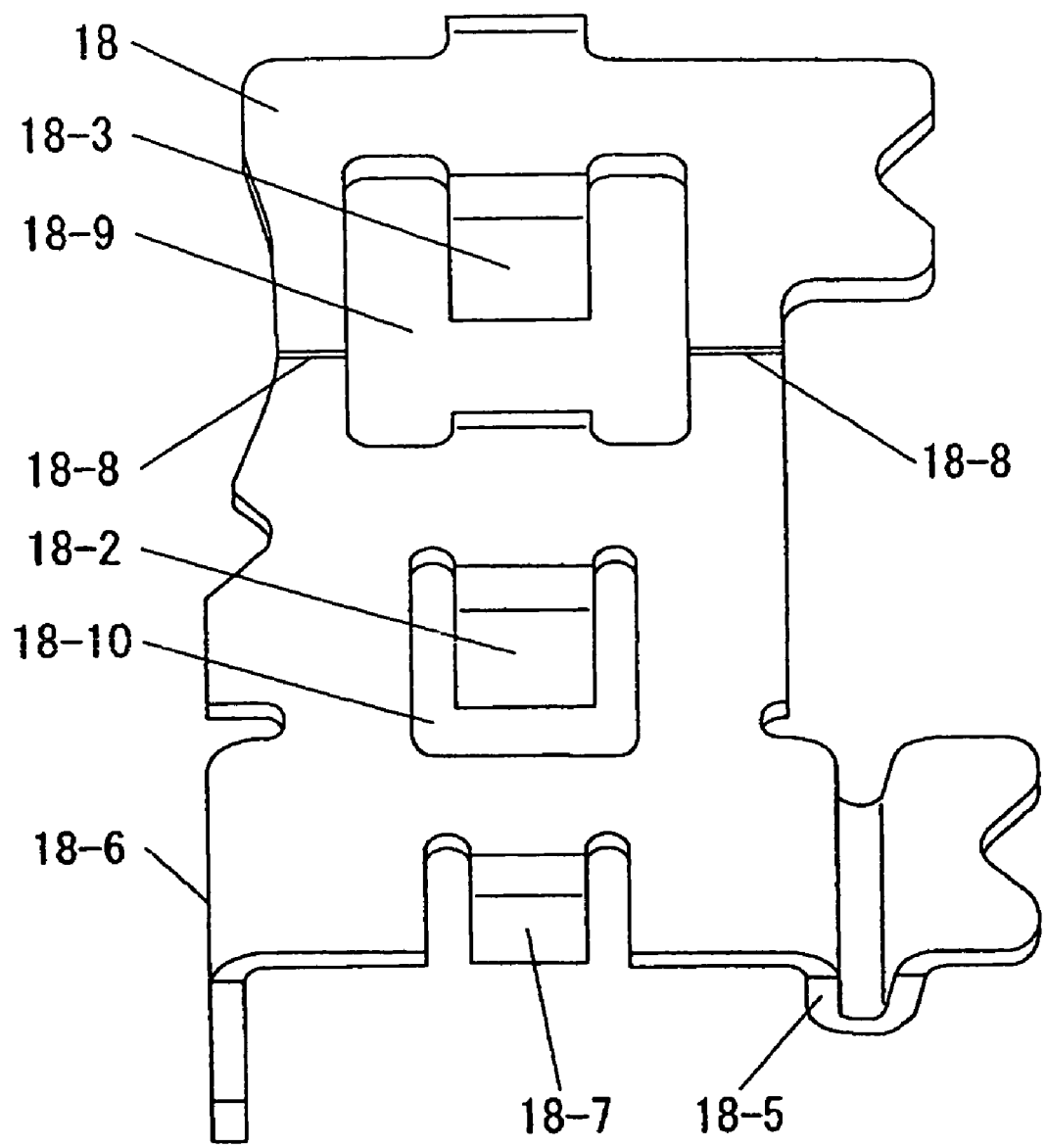
FIG. 15 is a perspective view showing a portion of the actuator device in Embodiment 3.
Figure 16:
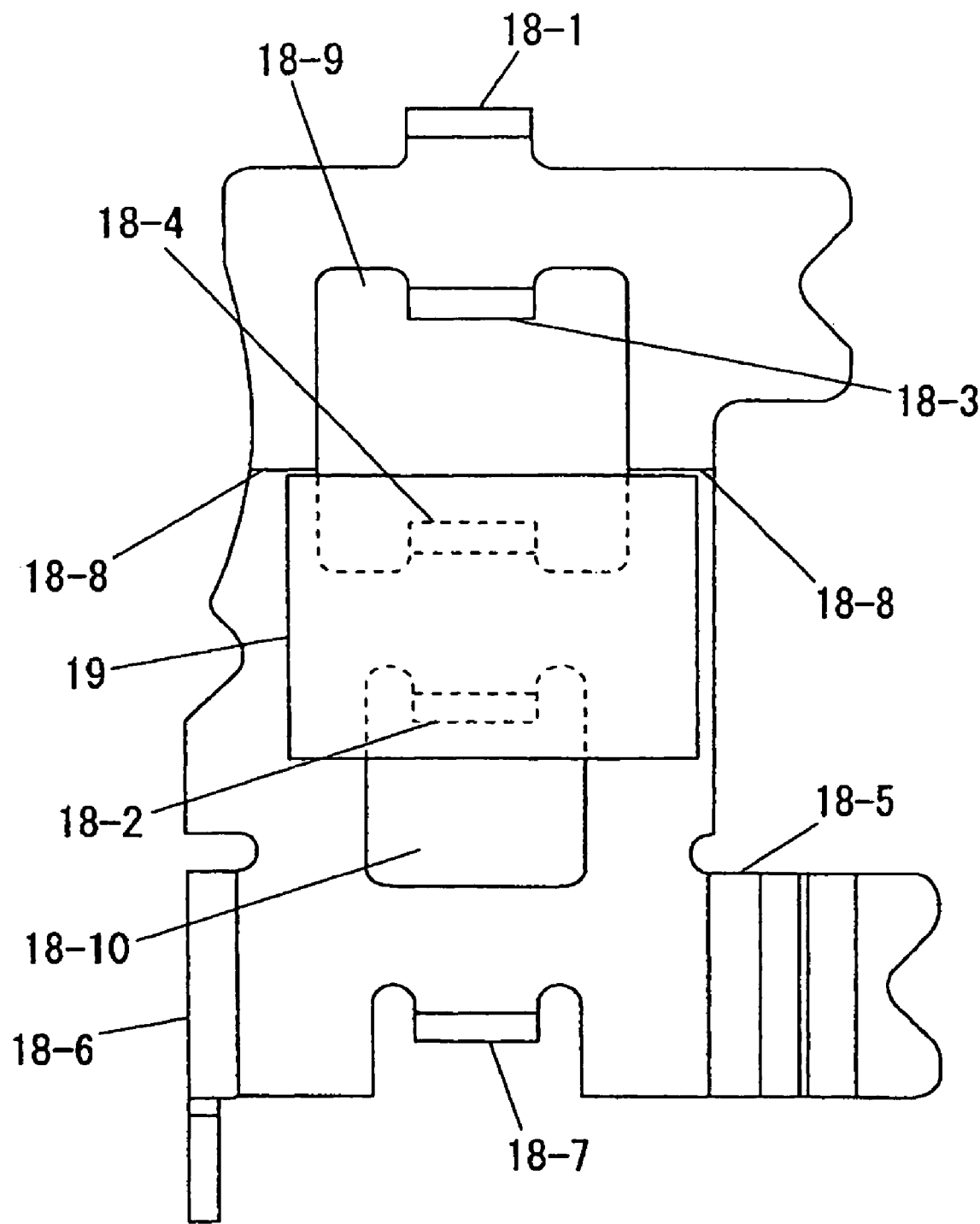
FIG. 16 is a back elevation showing a portion of the actuator device in Embodiment 3.
Figure 17:
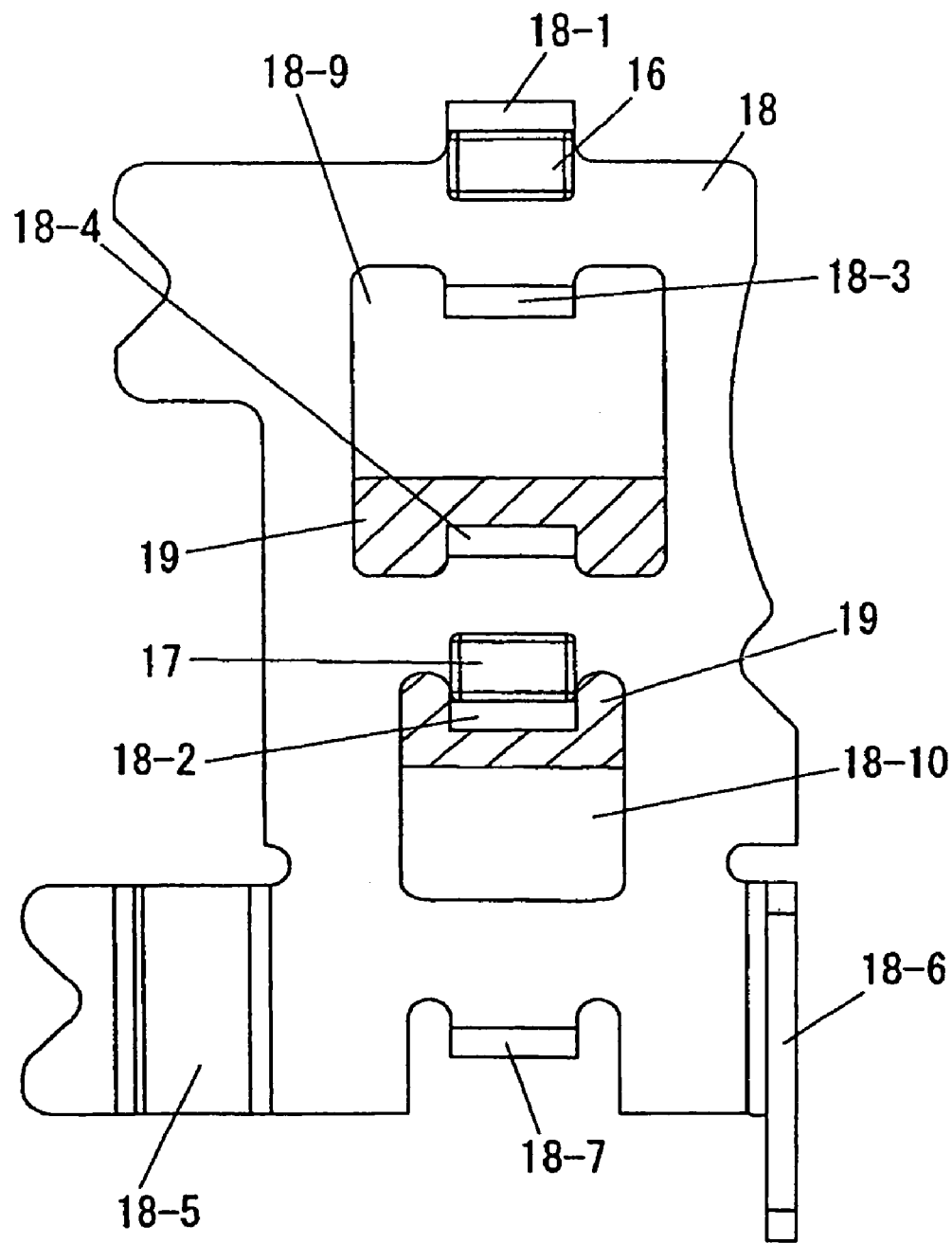
FIG. 17 is a front elevation showing a portion of the actuator device in Embodiment 3.
Figure 18:
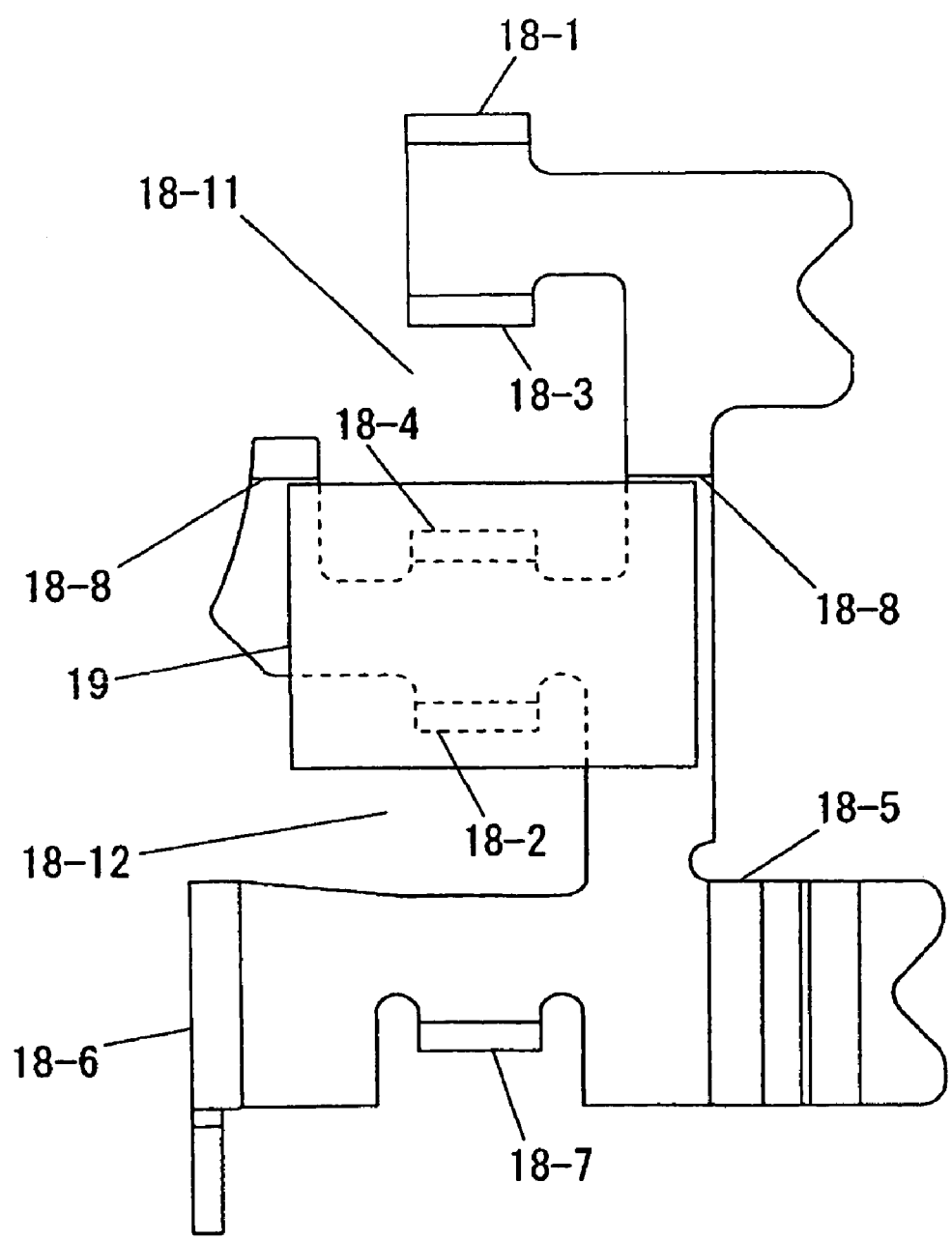
FIG. 18 is a back elevation showing a portion of the actuator device in Embodiment 3.
Figure 19:
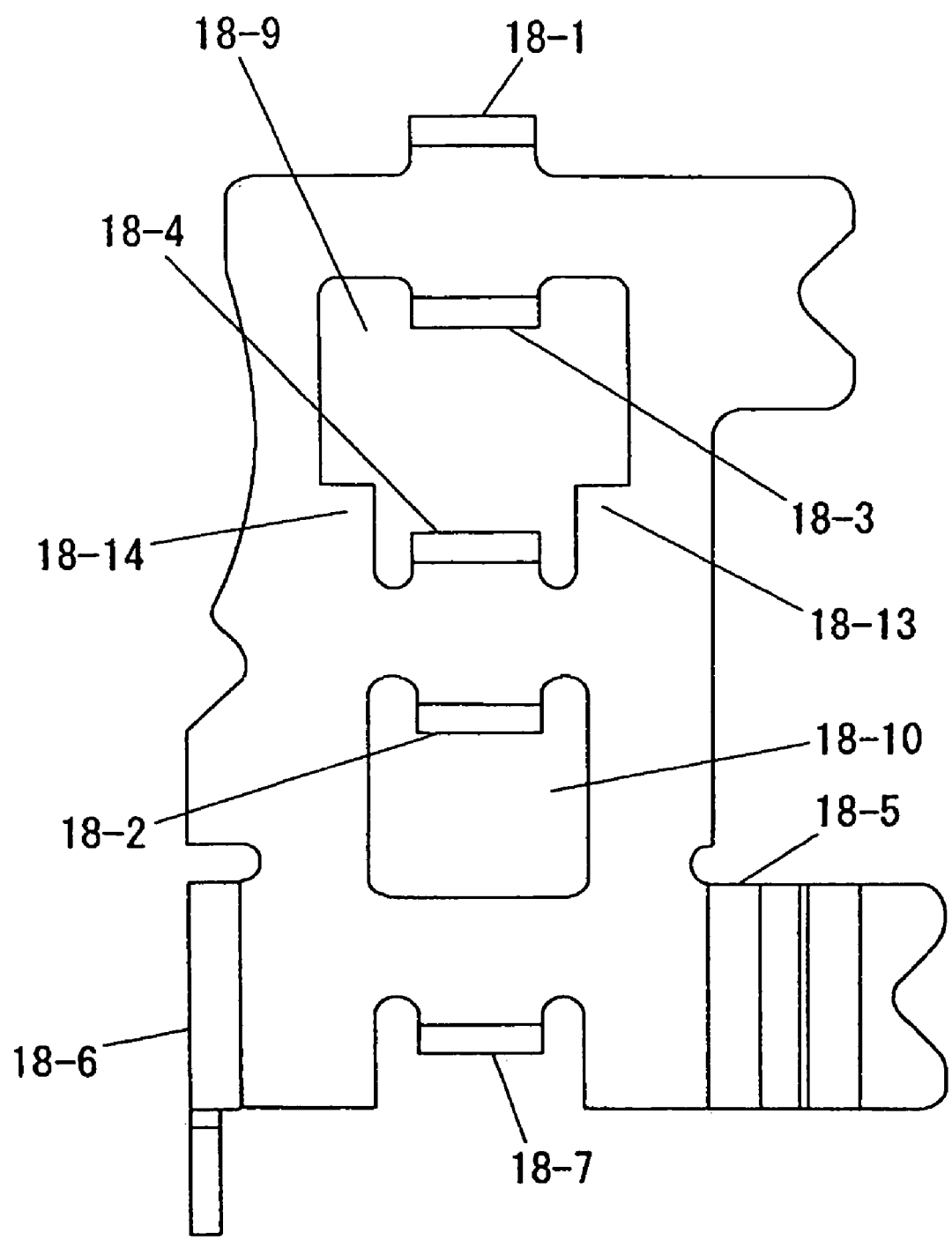
FIG. 19 is a back elevation showing a portion of the actuator device in Embodiment 3.

FIG. 9 is a perspective view showing an optical pickup module having the actuator device mounted thereon; FIG. 10 is a view showing the optical pickup module of FIG. 9 while omitting a carriage 25 and a flexible printed circuit (FPC) 26 and is an overall perspective view of the actuator device; FIG. 11 is a schematic view showing the actuator device of FIG. 10 while omitting the yoke 18; FIG. 12 is a side elevation showing the actuator device of FIG. 10; FIG. 13 is a perspective back view showing the actuator device of FIG. 10; FIG. 14 is a back view showing the actuator device of FIG. 10; FIG. 15 is a perspective back view showing the yoke 18 of FIG. 10; FIG. 16 is a back view showing the yoke 18 provided with the stopper 19; FIG. 17 is a front elevation showing the yoke 18 having the stopper 19 as well as the magnets 16 and 17; FIG. 18 is a backview showing a modification of the yoke 18; and FIG. 19 is a back view showing a modification of the yoke 18.

In FIG. 9, numeral 25 designates a carriage for carrying the actuator device, and the optical pickup module is constituted by mounting the actuator device on the carriage 25. The carriage 25 is provided with a shaft guide 25-1 and a shaft guide 25-1. A lead screw shaft (as referred to FIG. 25) is disposed through the shaft guide 25-1, and a guide shaft (as referred to FIG. 25) is disposed through the shaft guide 25-2. As the lead screw shaft rotates, the optical pickup module moves in the radial direction of the optical disk in the optical disk device such as an information playback device.

The numeral 26 designates the flexible printed circuit (FPC) for feeding an electric power and transmitting/receiving signals to the optical pickup module.

On the two sides of the tracking directions of the suspension holder 12, the yoke 18 is bent to have a rising portion 18-5 and a rising portion 18-6. As a result, a space enclosing the suspension wire 8 and the suspension wire 9 can be formed between the suspension holder 12 and the rising portion 18-5, and a space enclosing the suspension wire 10 and the suspension wire 11 can be formed between the suspension holder 12 and the rising portion 18-6. Into these spaces, there is injected a liquid braking member, which is composed mainly of silicone having an ultraviolet ray setting property. This braking member is made gel when irradiated with an ultraviolet ray. Thus, the braking member can suppress any unnecessary resonance to attain the optimum braking effect, in case the suspension wires 8, 9, 10 and 11 vibrate while supporting the lens holder 2. This braking member can be exemplified not only by the gel member but also by a viscoelastic material such as rubber or elastomer.

The suspension holder 12 is provided with a slope 12-1, a slope 12-2 and a slope 12-3. When an adhesive such as a photo-setting resin is dipped or applied to those slopes 12-1, 12-1 and 12-3, it flows by its own weight into the clearance between the yoke 18 and the suspension holder 12 (i.e., between the yoke 18-2 raised from the yoke 18 and the slope 12-1, between the flat face or side face of the yoke 18 and the slope 12-2 and between the flat face or side face of the yoke 18 and the slope 12-3) so that the yoke 18 and the suspension holder 12 can be fixed easily and firmly.

As shown in FIG. 10, moreover, a through hole 12-4 is formed in the suspension holder 12, and a raised yoke 18-7 is inserted into the through hole 14-2 so that the yoke 18 and the suspension holder 12 can be easily positioned. When an adhesive is dipped or applied to that through hole 12-4, the yoke 18 and the suspension holder 12 can be more firmly fixed.

Moreover, two soldered portions 27, which are individually connected electrically with the suspension wire 8 and the suspension wire 9 and which are also individually connected electrically with the focusing coil 3 and the tracking coils 4, 5, 6 and 7, as shown in FIG. 10, are so disposed in this embodiment as are located on not the extensions of the suspension wire 8 and the suspension wire 9. As a result, it is possible to enhance the workability and precision at the assembling time of the suspension wire 9 and the suspension substrate 13.

As shown in FIG. 11, the lens holder 2 is provided with a bulging face 2-6. To this bulging face 2-6, there is dipped or applied a photo-setting resin having a proper hardness and slippage when set. This shock-absorbing material such as a resin to be disposed on that bulging face 2-6 bulges the most in the lens holder 2 having the objective lens 1 mounted thereon, and in the focusing direction (i.e., in the direction A, as shown in FIG. 11) for the laser light to emanate from the objective lens 1 toward the not-shown optical disk. As a result, the objective lens 1 or the optical disk is hard to break even when the lens holder 2 and the optical disk are brought into contact by the impacts from the outside.

In the lens holder 2, moreover, a reference face 2-8 for mounting the objective lens 1 and the bulging face 2-6 are recessed in the direction A of FIG. 11 to form a groove 2-7. This configuration makes it hard for the resin or the shock-absorbing material to reach the reference face 2-8 when it is dipped or applied to the bulging face 2-6. Thus, the resin is hard to stick to the objective lens mounting portion of the lens holder 2 so that the lens holder 2 and the objective lens 1 can be precisely assembled.

As shown in FIG. 12 to FIG. 14, moreover, the yoke 18 is provided with a step 18-8, which is formed by altering its thickness to act as a positioning portion. The yoke 18 and the stopper 19 are fixed by holding one side of the stopper 19 against the step 18-8 and by an adhering or screwing method. Thus, the stopper 19 can be positioned and fixed at a predetermined place by forming the step 18-8 of the yoke 18. With this configuration, the yoke 18 need not be provided with a separate positioning member such as a pin. It is, therefore, possible to reduce the number of parts and to improve the assemblability and reduce the size of the actuator device. In this embodiment, on the other hand, the assembly of the suspension holder 12, the yoke 18 and the stopper 19 is called the "actuator base".

As shown in FIG. 15 to FIG. 17, moreover, the yoke 18 is provided with an opening 18-9 and an opening 18-10. When the actuator device is to be assembled, the protrusion 2-1 of the lens holder 2 is inserted into the opening 18-9 so that the extending face of the main flat face of the yoke 18 is interposed between the bottom surface 2-3 of the lens holder 2 and the leading end 2-4 of the protrusion 2-1. In this state (as shown in FIG. 12), the stopper 19 is mounted on the yoke 18. Especially as shown in FIG. 16 and FIG. 17, the stopper 19 mounted on the yoke 18 positioned by the step 18-8 clogs a portion of the opening 18-9. As a result, the lens holder 2, the yoke 18 and the stopper 19 thus assembled take: the configuration, in which the stopper 19 exists between the bottom surface 2-3 of the lens holder 2 and the leading end 2-4 of the protrusion 2-1; the configuration, in which the stopper 19 and the lens holder 2 exist in the optical direction of the objective lens 1 at a predetermined interval in the order of the bottom surface 2-3 of the lens holder 2, the stopper 19 and the leading end 2-4 of the protrusion 2-1; or the configuration, in which a portion of the lens holder 2 exists on the opposite side to the objective lens 1 the optical direction with respect to the stopper 19 mounted on the yoke 18.

Here, this embodiment has the configuration, in which the yoke 18 is provided with the opening 18-9 and the opening 18-10. However, the invention may also be configured such that the yoke 18 is provided with a notch 18-11 and a notch 18-12, as shown in FIG. 18. Thus, the yoke 18 can be further lightened to reduce the weight of the actuator device.

In this embodiment, the actuator base is assembled by fixing the suspension holder 12 on the yoke 18 having the stopper 19. Without providing the yoke 18 with the stopper 19, however, the actuator base may also be configured by fixing the suspension holder 12 on the yoke 18 provided with a stopper portion 18-13 and a stopper portion 18-14, as shown in FIG. 18, so that the stopper portion 18-13 and the stopper portion 18-14 may exist between the bottom surface 2-3 of the lens holder 2 and the leading end 2-4 of the protrusion 2-1. As a result, the number of parts can be further reduced to reduce the step number accordingly. Moreover, the actuator base can also be constituted by molding the yoke 18 and the suspension holder 12 integrally or by forming portion corresponding to the suspension holder 12 with only the yoke 18. Thus, the size reduction of the actuator device can be realized by the configuration, in which the leading end 2-4 of the protrusion 2-1 or the retaining portion of the lens holder 2 exists on the opposite side to the objective lens 1 in the optical axis direction with respect to the yoke 18.

(Embodiment 4)

Moreover, an optical disk device hard to break can be constituted by mounting the actuator device thus far described in Embodiment 1, Embodiment 2 or Embodiment 3, on the optical disk device to be described with reference to FIG. 20 and FIG. 21. Here, the following description will be made by employing the reference numerals used in Embodiment 1 and Embodiment 3, but could be likewise applied to the actuator device described in Embodiment 2.

Figure 20:
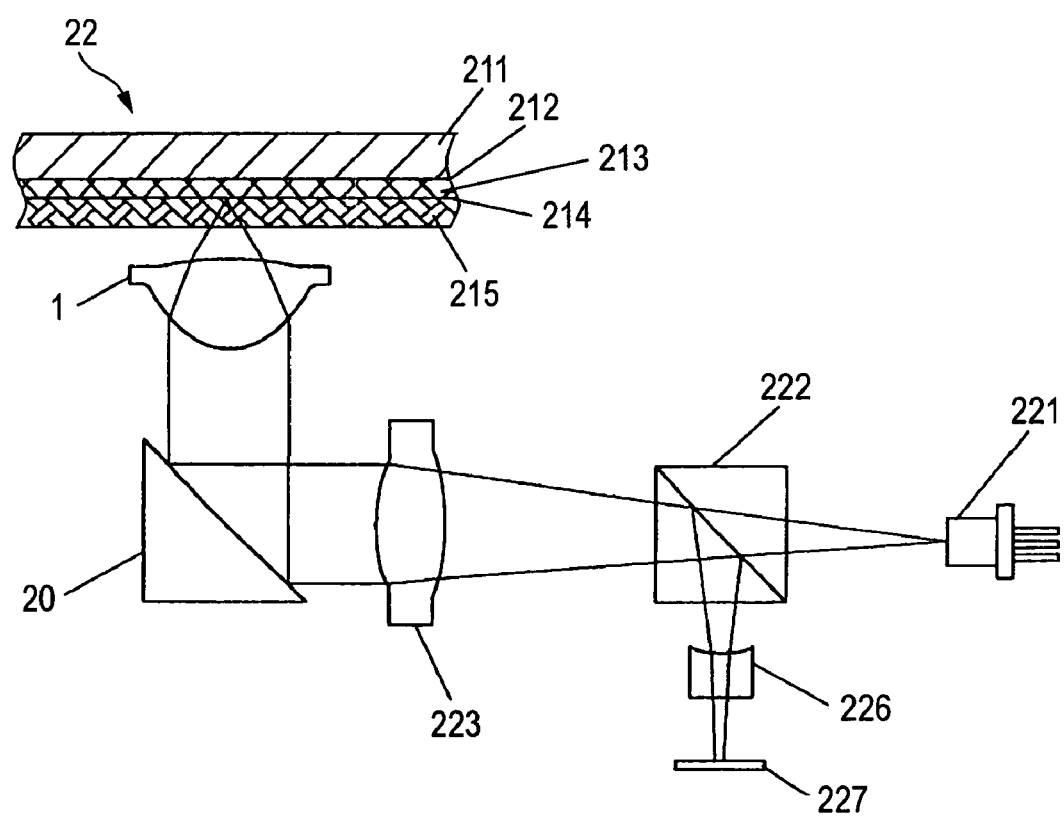
FIG. 20 is a configuration diagram of an optical disk device according to Embodiment 4.
Figure 21:
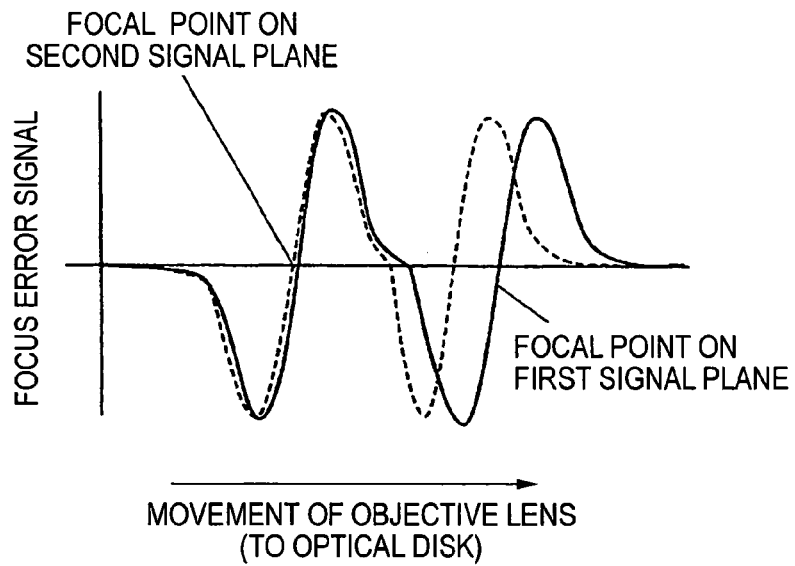
FIGS. 21A and 21B are characteristic diagrams illustrating focus servo signals in Embodiment 4.
Figure 21:
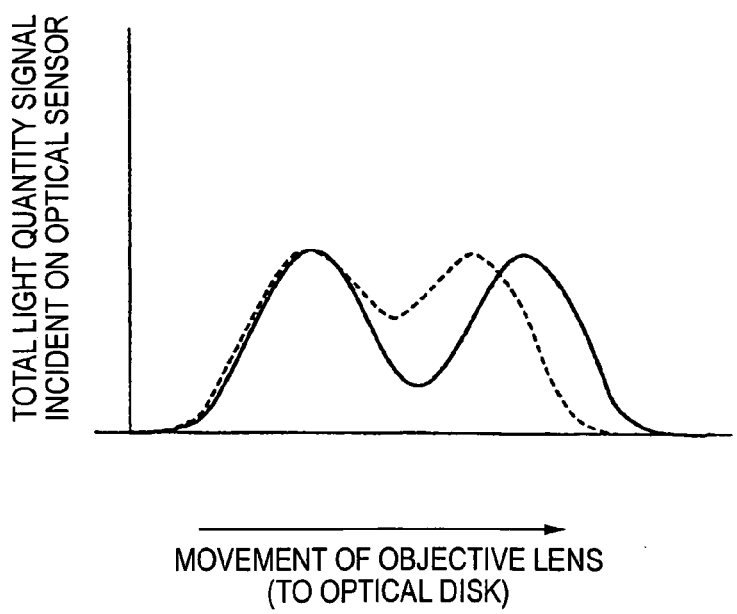

FIG. 20 is a configuration diagram of an optical disk device according to Embodiment 4. In FIG. 20, the optical disk 22 is configured by adhering a first signal face 212, in which signal pits are formed on the surface of a base 211 made of polycarbonate, and a second signal face 214, in which signal pits are formed on the surface of a protecting layer 215 of polycarbonate (having a refractive index $n_2$=1.62), through an intermediate layer 213 of a UV-setting adhesive (having a refractive index $n_1$=1.45) such that the second signal face 214 is directed toward the intermediate layer 213.

A light emitted from a loser light source 221 is a bluish violet semiconductor laser having a wavelength of 405 nm. The light emitted from the laser light source passes through a beam splitter 222 and a collimator lens 223 and is reflected on the rising mirror 20 so that it is focused on the signal face of the optical disk 22 thereby to form an optical spot. The objective lens 1 has a numerical aperture of 0.73. Moreover, the objective lens 1 is held by the focus servo mechanism, which has been described in Embodiment 1, Embodiment 2 or Embodiment 3 and which is displaced relative to the optical disk 22. The light is reflected by the optical disk 22 and returns through the objective lens 1 and the collimator lens 223. The light is then separated by the beam splitter 222 and is guided into a cylindrical lens 226 for providing the focus servo so that it is received by a light sensor 227.

The light, which is reflected by the first signal face 212 and the second signal face 214 of the optical disk 22, is caused to establish a light quantity distribution on the light sensor 227 by the action of the cylindrical lens 226 in accordance with the positional relation between the light spot and the individual signal faces. This light quantity distribution change is detected by the light sensor 227, and the objective lens 1 is subjected to a focus servo on the basis of those signals.

FIGS. 21A and 21B are characteristic diagrams illustrating the focus servo signals in Embodiment 4. FIG. 21A illustrates a focus error signal, and FIG. 21B illustrates a total light quantity signal incident on the light sensor 227. The characteristics by the optical disk device of this embodiment are plotted by solid lines, and the characteristics of a comparison, in which both the refractive index $n_1$ of the intermediate layer 213 and the refractive index $n_2$ of the protecting layer 215 are set to 1.62, are plotted by broken lines.

In this embodiment, the overlap of the focus error signals on the first signal face 212 and the second signal face 214 is small, and the total light quantity signal incident on the light sensor 227 is 40% of the maximum total light quantity signal and is about one half of the comparison of the equal refractive indices $n_1$ and $n_2$. As a result, the separation of the signal faces is excellent so that the more stable focus servo characteristics can be realized.

Table 1 tabulates predominances of the information recording density of the optical disk device and the influences of the thickness of the intermediate layer 213 of the optical disk 22 having the multi-layer configuration, over the numerical aperture of the objective lens 1, the wavelength of the laser light source 221, and the relation between the refractive index $n_1$ of the intermediate layer 213 and the refractive index $n_2$ of the protecting layer 215.

TABLE 1

| Wavelength of NA (Objective Lens Numerical Aperture), Relation between $n_1$ and $n_2$ | Information Recording Density | Influences of Thickness of Intermediate Layer of Optical Disk of Multi-Layer Configuration |
|---|---|---|
| NAO. 73, Wavelength 405 nm, $n_1 < n_2$ | ◯ | ◯ |
| NAO. 73, Wavelength 405 nm, $n_1 \geq n_2$ | ◯ | Δ |
| NAO. 60, Wavelength 650 nm | X | ◯ |
| NAO. 80, Wavelength 405 nm | ◎ | Δ (Spherical Aberration Correcting Means Required) |

Symbols (◯), (◎), (Δ) and (X) in (Table 1) indicate excellent, especially excellent, problem and worse, respectively. As the objective lens 1 has the higher numerical aperture and as the laser light source 221 has the shorter wavelength, the information recording density can be improved the better. When the laser has a wavelength of bluish violet and an allowable spherical aberration and when a relation of $n_1<n_2$ is satisfied, the spherical aberration due to the presence of the intermediate layer is within the allowable range, and the intermediate layer has a thickness satisfying the inter-layer crosstalk and the focus servo characteristics. It is, therefore, unnecessary to provide the spherical aberration correcting means as an additional mechanism. For $n_1 \geq n_2$, however, there appear the influences of the thickness of the intermediate layer of the optical disk of the multi-layer configuration. When the numerical aperture is 0.85, it is understood that the spherical aberration correcting means is additionally needed although the information recording density is excellent.

Thus, the optical disk device provided according to this embodiment for playing back or recording the optical disk 22 of the multi-layer configuration comprises: the base 211; the plural signal faces laminated over the base 211 through the intermediate layer 213; and the protecting layer 215 over the surface of the plural signal faces. The light from the light source for emitting the light having a wavelength of 350 nm to 500 nm is focused by the objective lens 1 having the numerical aperture of 0.70 nm to 500 nm on the optical disk 22, of which the intermediate layer 213 has a refractive index $n_1$ smaller than the refractive index $n_2$ of the protecting layer 215.

With this configuration, the spherical aberration by the intermediate layer 213 can be suppressed to increase the density without adding any optical configuration for correcting the spherical aberration due to the intermediate layer 213. Moreover, the separation of the focus servo signals on the individual signal faces can be enlarged to play back or record the individual signal faces of the optical disk 22 of the multi-layer configuration thereby to provide a small-sized and low-price optical disk device.

Here, an optical pickup device hard to break can be constituted by mounting the actuator device described in Embodiment 1, Embodiment 2 or Embodiment 3, on the optical pickup device, as has been described in Japanese Patent Application No. 2004-216780.

(Embodiment 5)

It is also possible to constitute an information playback device hard to break, by mounting either the actuator device described in Embodiment 1, Embodiment 2 or Embodiment 3, or the optical disk device described in Embodiment 4. The invention can also be practiced by mounting the device on an information playback device, as disclosed in U.S. patent application Ser. No. 11/031,533.

Here, the following description will be made by employing reference numerals used in Embodiment 1, Embodiment 3 and Embodiment 4. However, the invention can also be practiced by an application to the actuator device described in Embodiment 2.

Figure 22:
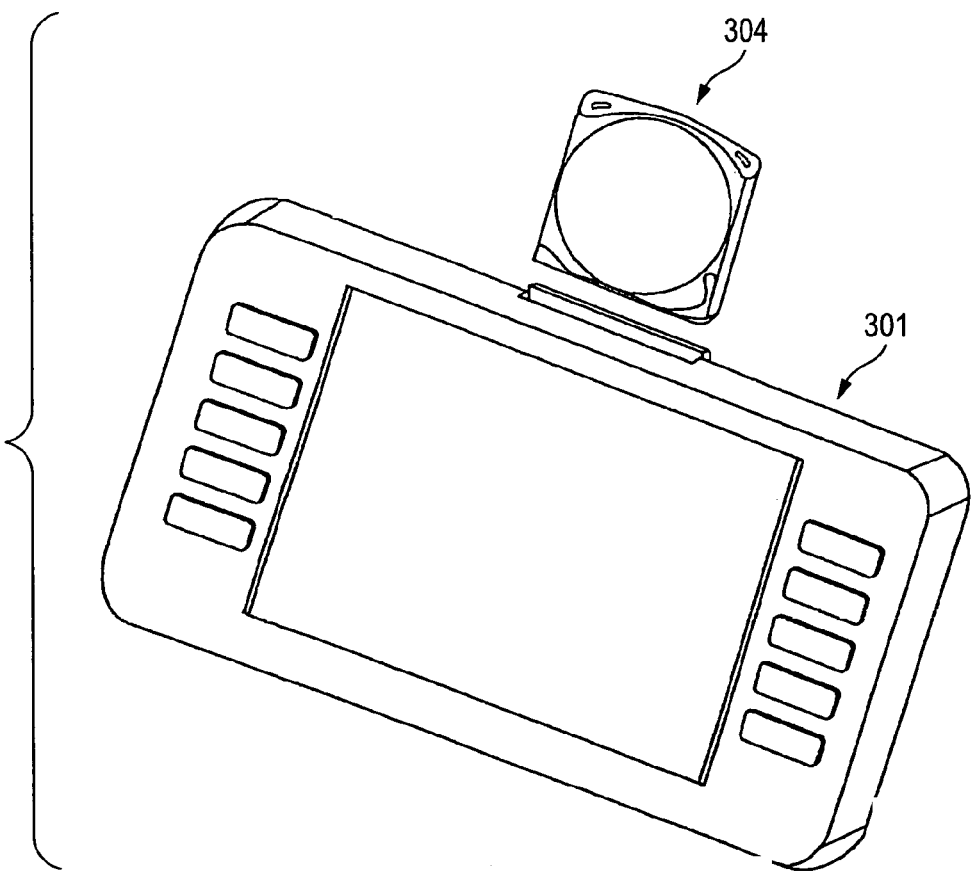
FIG. 22 is a perspective view showing a mobile terminal device having an information playback device according to Embodiment 5 packaged therein.
Figure 23:
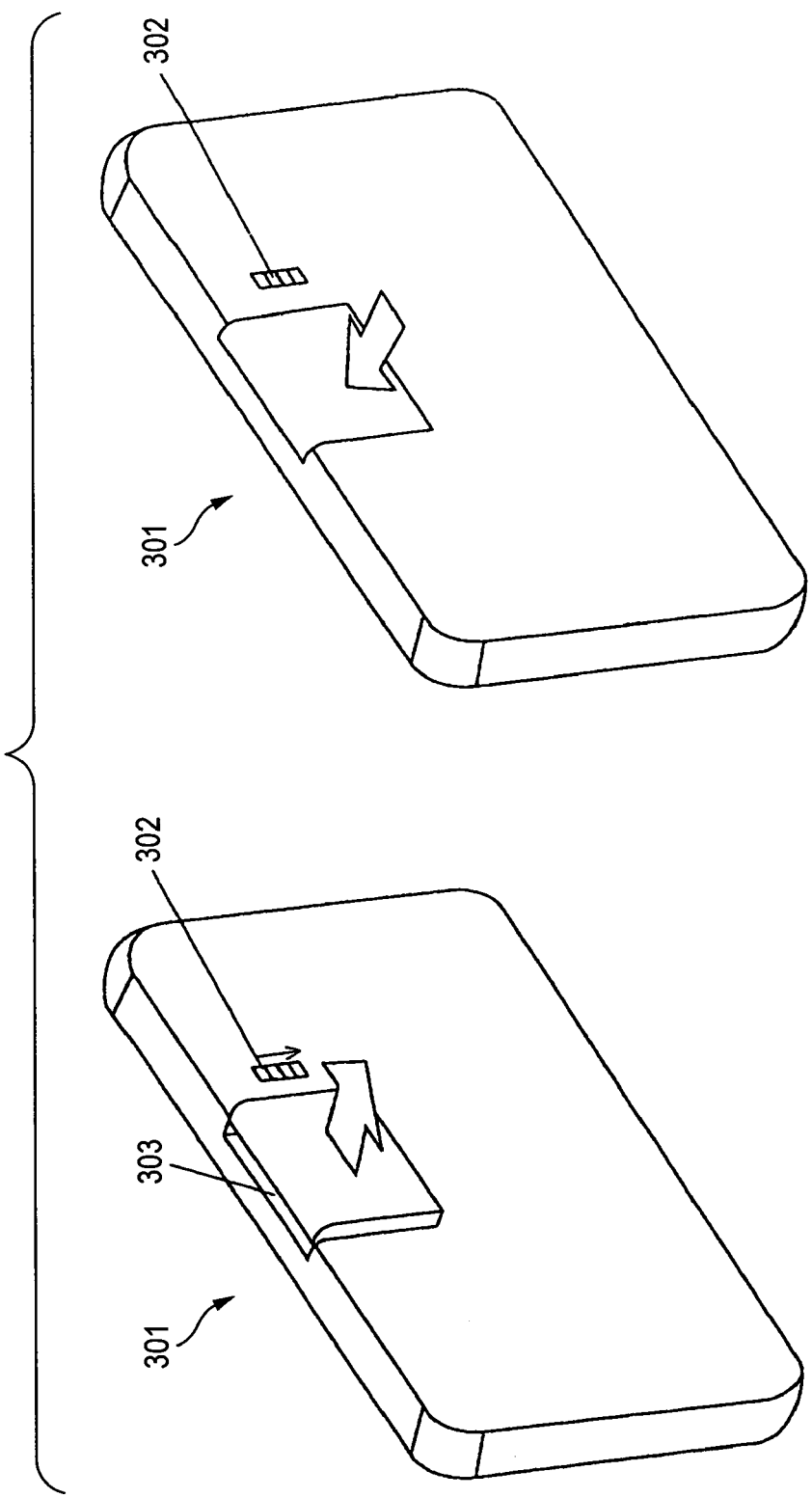
FIG. 23 is a perspective view showing a mobile terminal device having the information playback device according to Embodiment 5 packaged therein.

FIG. 22 shows an information playback device according to Embodiment 5, and FIG. 23 is a perspective view showing the information playback device from the back.

As shown in FIG. 22, an information playback device 301 can be packaged in a mobile terminal device such as a PDA or a mobile game machine. By sliding a slide button 302 of the mobile terminal device 301, as shown in FIG. 23, an optical disk cartridge slot 303 can appear to insert an optical disk cartridge 304. After the optical disk cartridge 304 was mounted, the optical disk cartridge 304 is chuck into a disk playback state by pushing the holder portion lifted.

Figure 24:
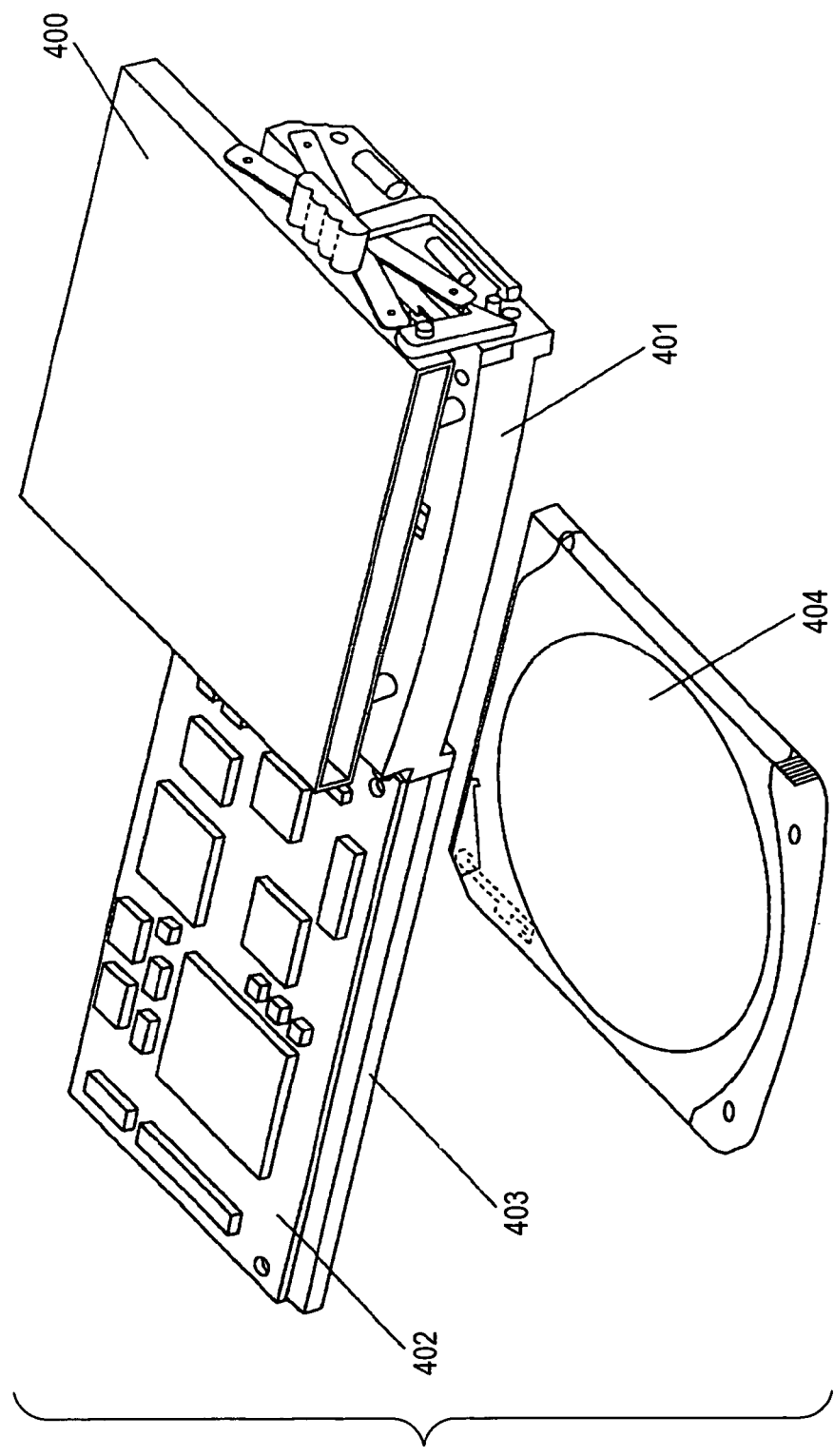
FIG. 24 is a perspective view of the information playback device in Embodiment 5.

FIG. 24 is a perspective view of the state, in which only the packaged information playback device is extracted.

In FIG. 24: numeral 400 designates a holder capable of inserting a cartridge disk 404; numeral 401 a recording/playback device body having the optical disk recording/playback device mounted thereon; and numeral 402 an electronic board for processing a signal outputted from the playback device body, to send an electric signal to a mobile terminal. A resin portion fixing the electronic board 402 is a board supporting member 403.

Figure 25:
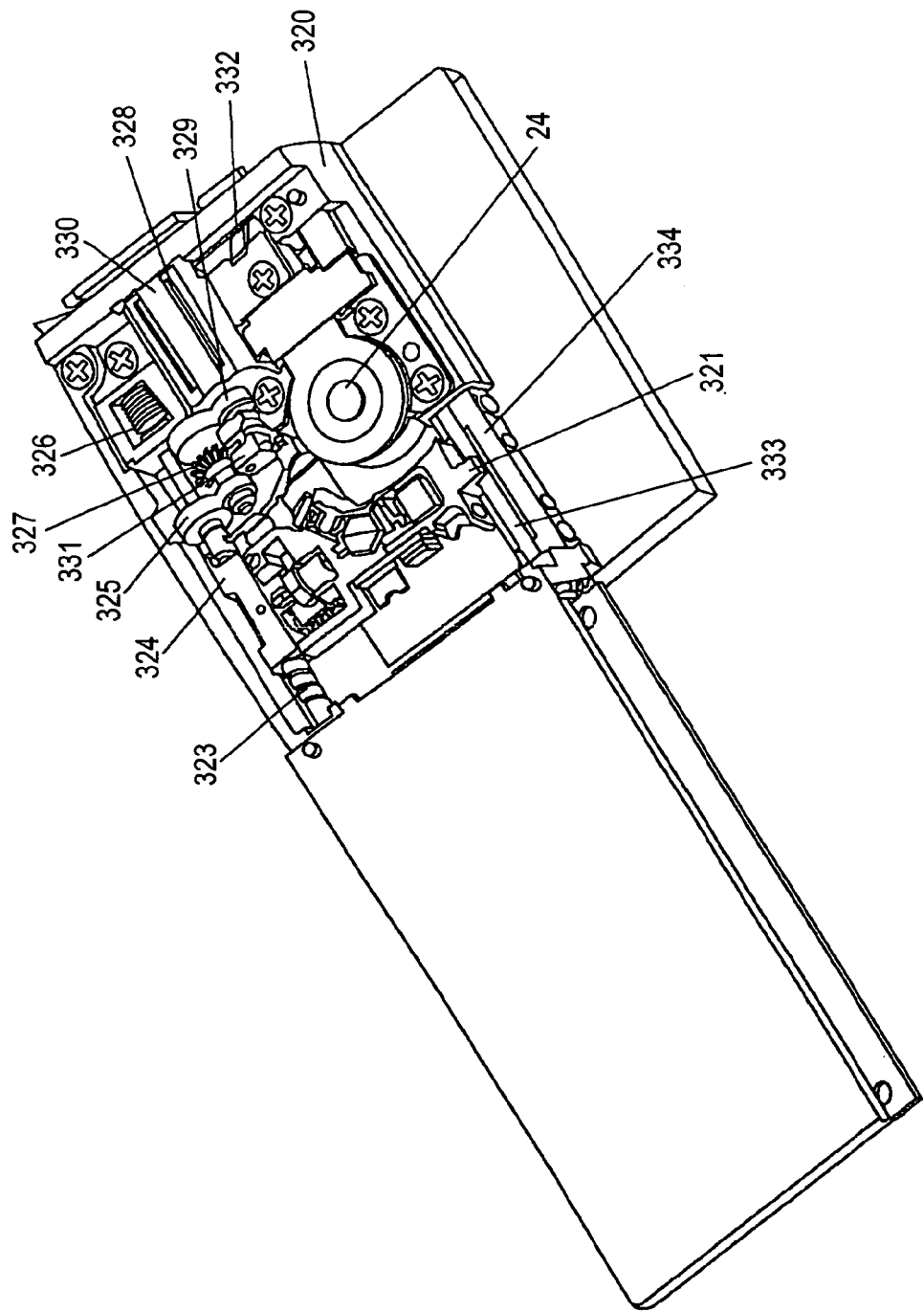
FIG. 25 is a perspective view showing the detail of the inside of the information playback device in Embodiment 5.

FIG. 25 is a perspective view, as taken from the lower face, of the state of the playback device body of the information playback device to be packaged in the mobile terminal.

In FIG. 25: numeral 320 designates a recording/playback mechanism body for the base of the playback mechanism; numeral 321 an optical pickup module (the detail of which should be referred to FIG. 9) for recording and playing back the optical disk; the numeral 24 the spindle motor acting as a power source for turning the optical disk; numeral 323 a threaded lead screw shaft for moving the optical pickup module 321 to an inner or outer circumference position of the optical disk; numeral 324 a rack leaf spring for transmitting the power from the lead screw shaft 323 to the optical pickup module 321 and for holding the FPC (Flexible Printed Circuit) assembled in the optical pickup module 321; numeral 325 a lead screw shaft gear fixed on the lead screw shaft 321; numeral 326 a lead screw shaft push spring for pushing the lead screw shaft 321 in an arbitrary direction; numeral 327 an intermediate gear having gears on its two sides and a circular shielding plate slit at its central portion; numeral 328 a feed motor acting as a power source for rotating the lead screw shaft 321; numeral 329 a motor gear mounted on the spindle of the feed motor 328; numeral 330 a motor fixing member for holding the motor; numeral 331 a photo interrupter for measuring the speed of the intermediate gear to measure the speed of the motor; numeral 332 a recording/playback mechanism vertical movement sensing lever for detecting the vertical movements of the playback mechanism when the optical disk cartridge having the optical disk assembled therein is mounted on or demounted from the optical disk drive; numeral 333 a guide shaft for regulating and guiding the actions of the optical pickup module 321 to the inner or outer circumferential position of the optical disk; and numeral 334 a guide shaft fixing member for fixing the guide shaft 333 in the recording/playback mechanism body 320.

Figure 26:
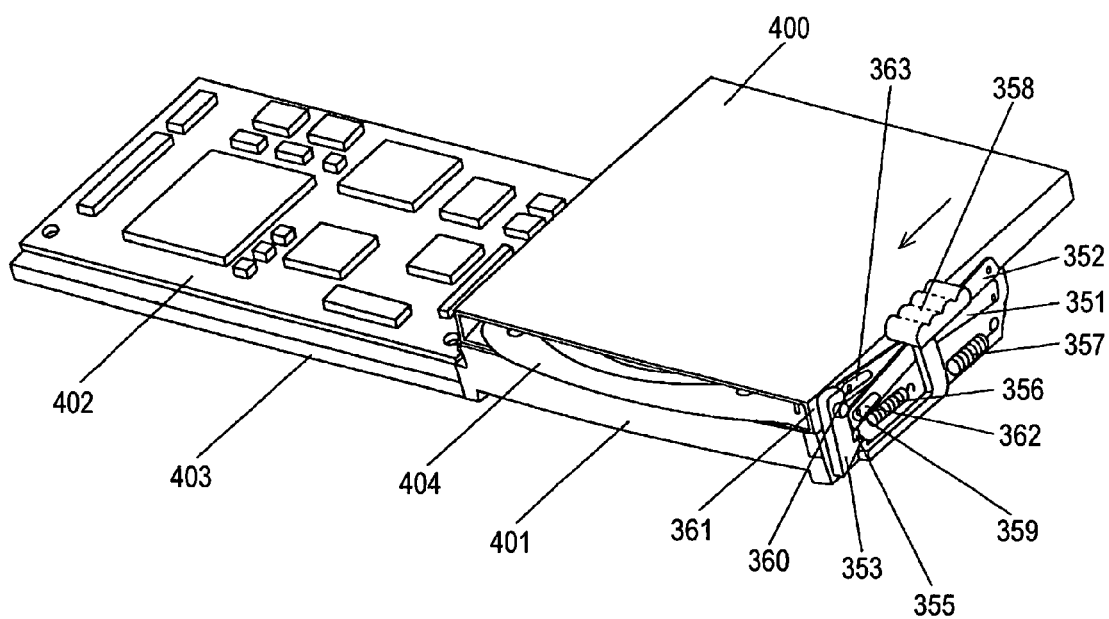
FIG. 26 is a perspective view showing a holder drive unit in Embodiment 5.

FIG. 26 is a view of the information playback device taken from the side. Numeral 351 designates a side guide member made of a metal and attached to the two sides for regulating the vertical movements of the cartridge holder 404, and numeral 352 also designates a side guide member made of a metal and attached to the two sides for regulating the vertical movements of the cartridge holder 404. These two side guide members 351 and 352 engage at their central portions with each other so that they can turn.

Numeral 359 designates a shaft, which is fixed on the side guide member 352 and which can slide in a groove 362 formed in the optical disk device body. Numeral 360 designates a shaft, which is also fixed on the side guide member 351 and which can slide in a groove 363 of the holder 400. Numeral 356 designates a bias spring connecting the side guide member 352 and the recording/playback device body 401; numeral 358 a slide switch, which can slide in the direction of arrow; and numeral 357 a bias spring connecting the slide switch 358 and the recording/playback device body 401. Numeral 353 designates a lock pawl, which can turn on a lock pawl shaft 354 mounted on the side of the holder 400. Numeral 355 designates a locking shaft.

Figure 27:
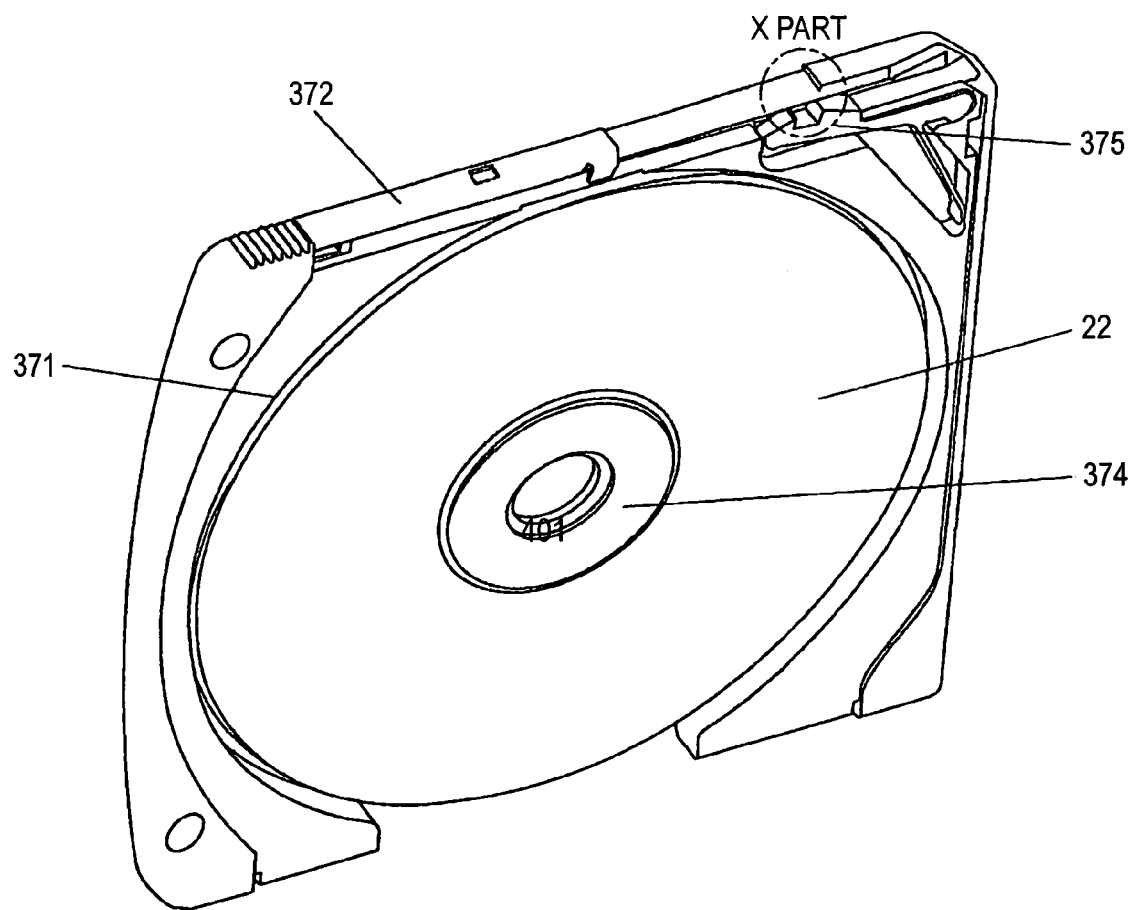
FIG. 27 is a view showing an optical disk cartridge in Embodiment 5.

FIG. 27 is a view showing the internal configuration of an optical disk cartridge 371. Numeral 374 designates a metal ring fixed on the optical disk 22, and numeral 375 a shutter retaining member for retaining a cartridge shutter 372.

Next, the operating method and the action of the information playback device (or the optical disk drive device) are described with reference to FIG. 28 and FIG. 29.

Figure 28:
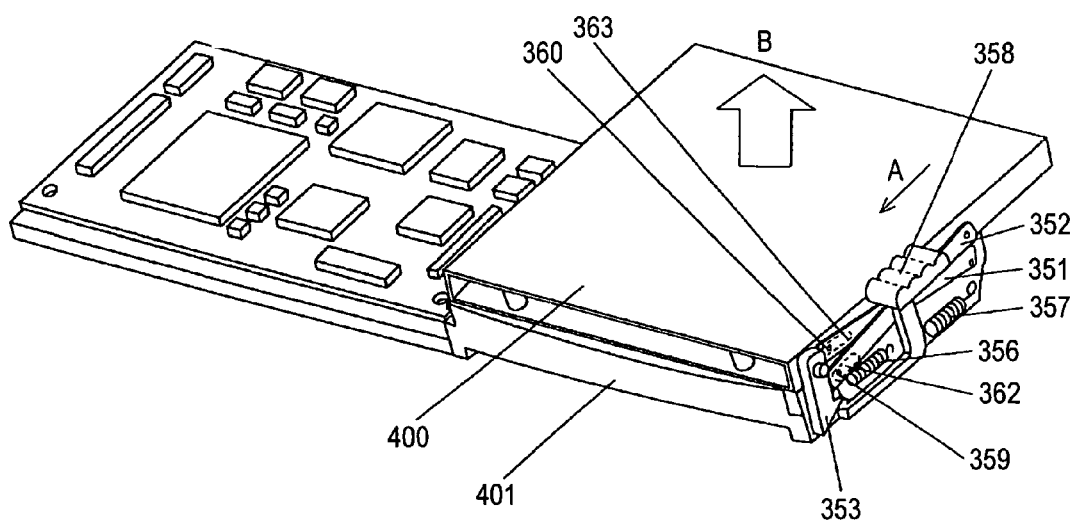
FIG. 28 is a perspective view showing a holder drive unit in Embodiment 5.
Figure 29:
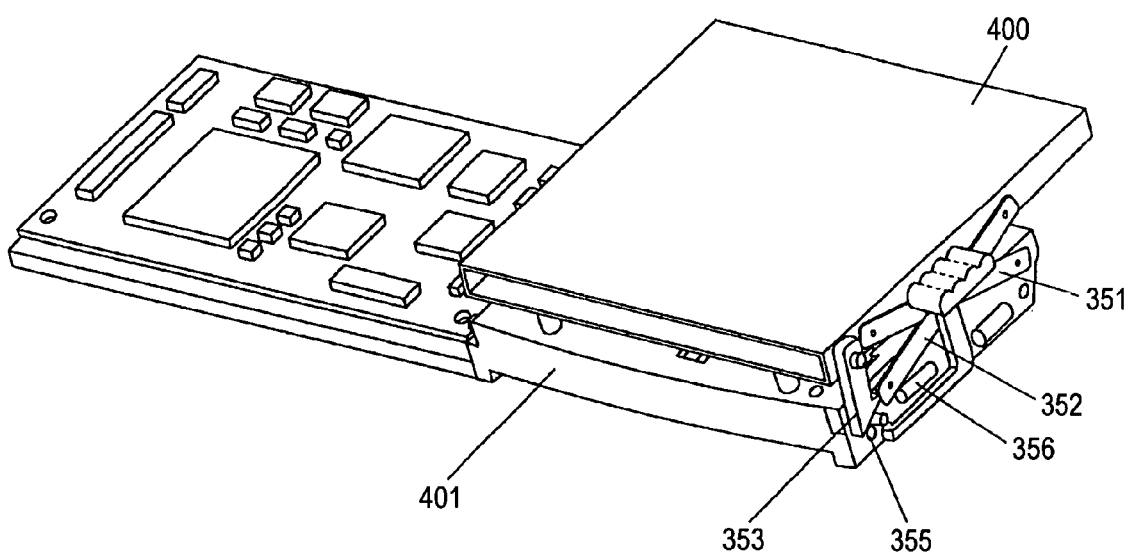
FIG. 29 is a view showing an operation of the information playback device in Embodiment 5.

At first, the slide switch 358 is slid in the direction of arrow A, as shown in FIG. 28, in case the optical disk cartridge 404 having an optical disk is to be inserted. Then, the leading end of the slide switch 358 pushes the leading end of the locking pawl 353 biased onto the locking shaft 355 by the toggle spring, so that the locking pawl 353 is released from the locking shaft 355. At this time, the shaft 359 at the leading end of the side guide member 352 slides in the groove 362 of the optical disk device body to push up the holder 400 in the upward direction B. This pushed-up state is shown in FIG. 29, and the mobile terminal body takes the state of FIG. 23 so that the optical disk cartridge slot 303 or the opening for inserting the optical disk cartridge 304 appears. In this state, the optical disk cartridge 304 can be inserted, as shown in FIG. 22.

Figure 30:
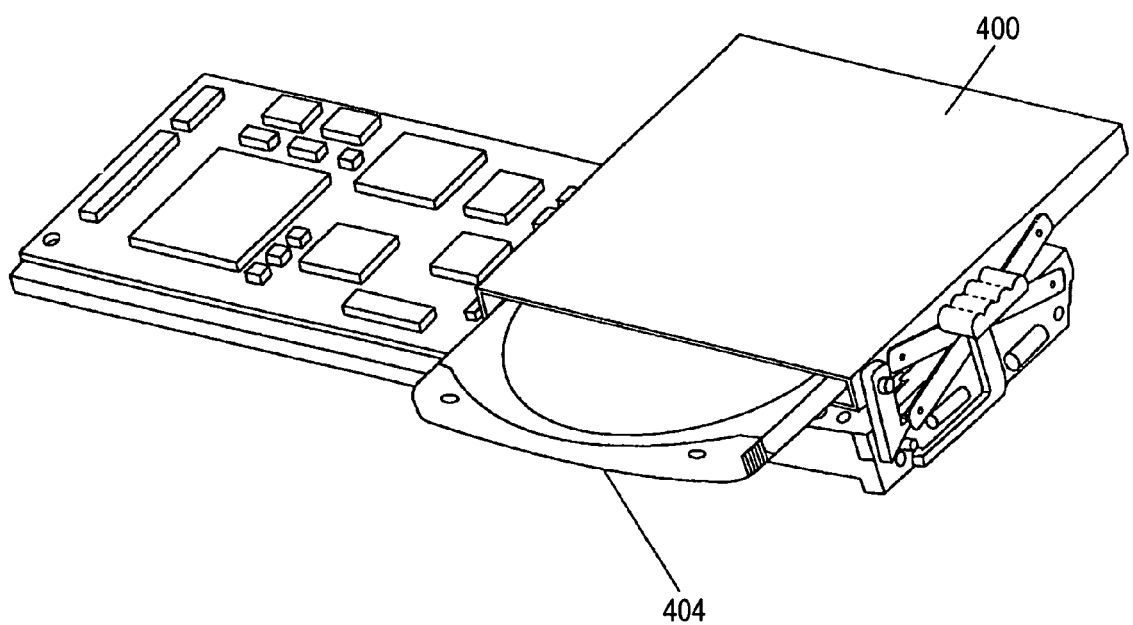
FIG. 30 is a view showing an operation of the information playback device in Embodiment 5.
Figure 31:
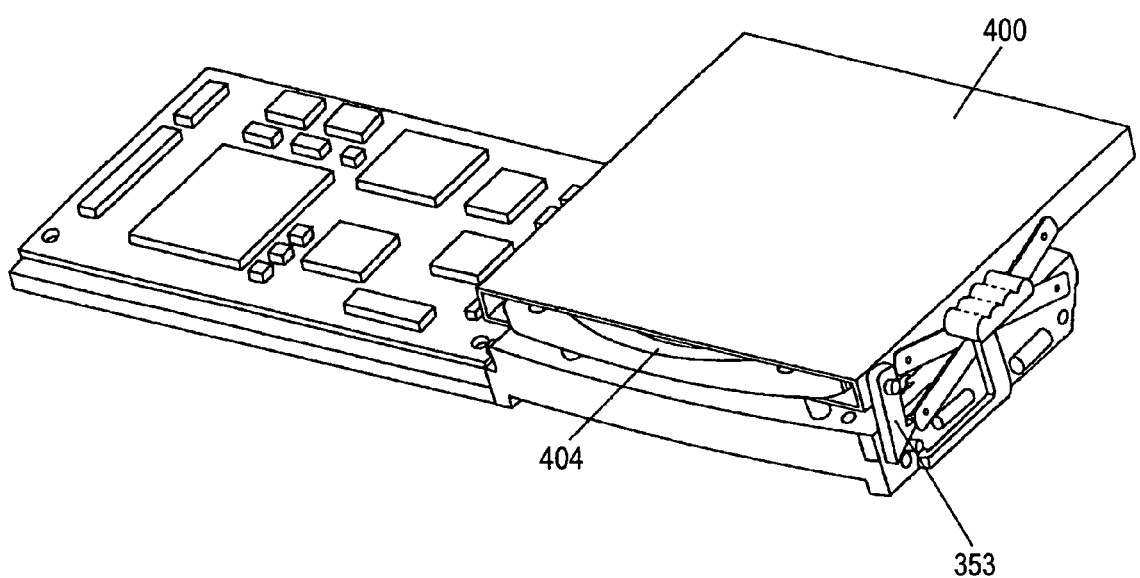
FIG. 31 is a view showing an operation of the information playback device in Embodiment 5.
Figure 32:
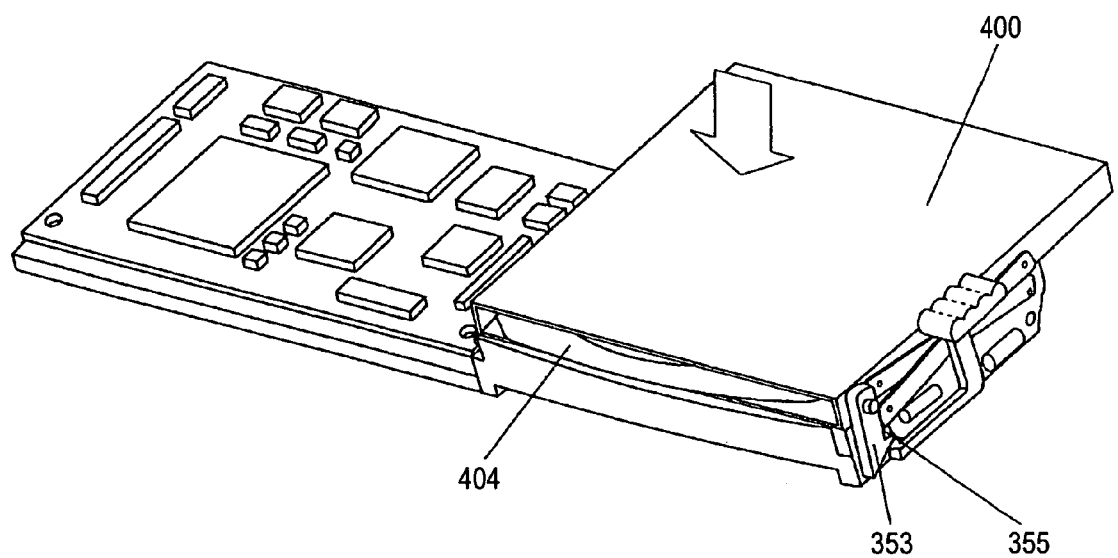
FIG. 32 is a view showing an operation of the information playback device in Embodiment 5.

Next, the actions for establishing the playback state by inserting the optical disk cartridge 404 is described. FIG. 30 shows the actions at the time when the optical disk cartridge 404 is inserted. The optical disk cartridge 404 is inserted into the slot of the holder 400 in the raised state. The insertion-completed state is shown in FIG. 31. The state, in which the holder 400 is pushed down, is shown in FIG. 32.

When the holder 400 having the optical disk cartridge 404 inserted thereinto is pushed down, the locking pawl 353 rides over the locking shaft 355 but is locked on the locking shaft 355 by the toggle spring so that the holder 400 is fixed on the recording/playback device body 401. The optical disk in the optical disk cartridge 404 is loaded into the chucking portion of the spindle motor, thus establishing the optical disk playback state.

Thus in this embodiment, the information playback device 1 is configured to comprise: the slot for inserting the optical disk 22 thereinto; the lifting unit for opening/closing the slot; the playback unit for playing back at least the information from the optical disk 22 held in the lifting unit; and the electronic board for converting the optical signal outputted from the playback unit into the electric signal and for sending the electric signal to the mobile terminal.

The playback unit includes: the optical system having the light source and the optical parts for reading the information recorded in the optical disk 22; the motor for turning the optical disk 22; and the drive unit for moving the optical system in the radial direction of the optical disk 22.

With this configuration, the distributed contents media information can be easily seen at the display unit of the mobile terminal. Therefore, the data need not be transferred from the personal computer or another video player so that the small-sized information playback device of convenient operations can be realized.

Moreover, the information playback device thus far described in connection with the embodiment can be utilized as the small-sized optical disk drive device, which can be packaged in the mobile game machine or the multi-function mobile terminal. By opening a portion of the mobile terminal, the optical disk cartridge can be easily mounted to play back the contents while ensuring the protection of the copyright without down-loading the contents from the internet.

This application is based upon and claims the benefit of priority of Japanese Patent Application No. 2004-196540 filed on Apr. 7, 2002, Japanese Patent Application No. 2004-196543 filed on Apr. 7, 2002, Japanese Patent Application No. 2004-216782 filed on Apr. 07, 2026, Japanese Patent Application No. 2005-131985 filed on May 04, 2028, the contents of which are incorporated herein by references in its entirety.

What is claimed is:

1. An actuator device comprising:
an objective lens for focusing a light on a recording and/or playback face of a recording medium;
a lens holder for holding the objective lens;
a suspension for elastically supporting the lens holder; and
an actuator base for supporting the suspension,
wherein the lens holder has a portion for stopping movement of the lens holder toward the recording medium, said portion being provided on an opposite side of the lens holder relative to a side of the lens holder at which the objective lens is disposed, said portion being provided in partially overlapping relation with the objective lens in a projection view on the recording medium in a direction parallel with an optical axis of the objective lens.

2. The actuator device according to claim 1, wherein the actuator base includes a stopper, the stopper being provided on the opposite side of the actuator base with respect to the objective lens, and said portion regulates movement of the lens holder toward the recording medium by engaging the stopper.

3. The actuator device according to claim 1, wherein the stopper is provided on a predetermined area of the actuator base, and the predetermined portion engages the stopper within the predetermined area.

4. The actuator device according to claim 3, wherein the stopper member is made of a material for transmitting a light and is arranged between a rising mirror for guiding the light from a light source into the objective lens and the lens holder.

5. The actuator device according to claim 4, wherein the stopper member is a quarter-wavelength plate.

6. The actuator device according to claim 4, wherein the stopper member is a collimator lens.

7. The actuator device according to claim 1, wherein the actuator base includes: a suspension holder for supporting the suspension; and a yoke for holding the suspension holder, and wherein the yoke is provided on the opposite side of the actuator base with respect to the objective lens.

8. The actuator device according to claim 7, wherein the drive center of a magnetic circuit configured of: a focusing coil for driving the lens holder in focusing directions; a focusing magnet disposed in the yoke; and the yoke is identical to the position of the center of gravity of a moving unit composed of: the objective lens; the lens holder; the focusing coil; and a tracking coil for driving the lens holder in tracking directions.

9. The actuator device according to claim 7, wherein the drive center of a magnetic circuit configured of: a tracking coil for driving the lens holder in tracking directions; a tracking magnet disposed in the yoke; and the yoke is identical to the position of the center of gravity of a moving unit composed of: the objective lens; the lens holder; the focusing coil; and a tracking coil for driving the lens holder in the tracking directions.

10. The actuator device according to claim 1, wherein the predetermined portion includes a first retaining portion and a second retaining portion.

11. The actuator device according to claim 10, wherein the first retaining portion and the second retaining portion are arranged substantially symmetric positions of the tracking directions with respect to the optical axis of a laser light incident on the objective lens.

12. The actuator device according to claim 10, wherein the first retaining portion and the retaining portion have substantially identical shapes.

13. The actuator device according to claim 10, wherein the gap L between the first retaining portion and the second retaining portion has a relation of $L \geq D+2 \times S$ with the necessary luminous flux diameter D of the light incident on the objective lens and the shift S of the objective lens in the tracking directions.

14. The actuator device according to claim 10, wherein the leading ends of the retaining portions are arranged closer to a light source than the optical axis of the objective lens.

15. The actuator device according to claim 10, wherein at least one portion of the retaining portions to confront a rising mirror for guiding the light from a light source into the objective lens is shaped substantially in parallel with the rising mirror.

16. The optical disk device having an actuator device according to claim 1 mounted thereon, for playing back or recording an optical disk of a multi-layer configuration, comprising: a base; a plurality of signal faces laminated over the base through an intermediate layer; and a protecting layer over the surface of the plural signal faces, wherein the light from a light source for emitting a light having a wavelength of 350 nm to 500 nm is focused by the objective lens having a numerical aperture of 0.70 nm to 500 nm on an optical disk, of which the intermediate layer has a refractive index $n_1$ smaller than the refractive index $n_2$ of the protecting layer.

17. An information playback device, comprising:
 a holder including a slot for inserting an optical disk into said holder;
 a lifting unit that moves said holder to open/close the slot;
 a playback unit for playing back at least the information from the optical disk held in the holder;
 an electronic board for converting an optical signal output from the playback unit into an electronic signal and for sending the electronic signal to a mobile terminal; and
 an actuator device comprising:
 an objective lens for focusing a light on a recording and/or playback face of said optical disk;
 a lens holder for holding the objective lens;
 a suspension for elastically supporting the lens holder; and
 an actuator base for supporting the suspension,
 wherein the lens holder includes a portion disposed on a side of the lens holder such that in operation the objective lens is interposed between the optical disk and said portion, said portion being operable to regulate movement of the lens holder toward the recording medium.

18. An actuator device comprising:
 (a) a moving unit that comprises
  an objective lens for focusing a light on a recording and/or playback face of a recording medium;
  a tracking unit for controlling a position of the objective lens, the tracking unit comprising a first tracking coil and a second tracking coil; and
  a lens holder for holding the objective lens;
 (b) a suspension for elastically supporting the lens holder; and
 (c) an actuator base for supporting the suspension,
 wherein the moving unit has a portion to be engaged with a stopper separate from the moving unit, said portion for stopping movement of the moving unit toward the recording medium, said portion being provided in its entirety between the first tracking coil and the second tracking coil in a projection view on the recording medium when viewed in a tracking direction of the tracking unit.

* * * * *